United States Patent
Wang et al.

(10) Patent No.: US 10,230,273 B2
(45) Date of Patent: Mar. 12, 2019

(54) ELECTRICITY TRANSMISSION SENDING METHOD AND DEVICE, AND SYSTEM

(71) Applicant: Huawei Technologies Co., Ltd., Shenzhen, Guangdong (CN)

(72) Inventors: Fuchao Wang, Shenzhen (CN); Fan Tian, Shenzhen (CN); Yuchao Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 770 days.

(21) Appl. No.: 14/582,738

(22) Filed: Dec. 24, 2014

(65) Prior Publication Data

US 2015/0188365 A1   Jul. 2, 2015

(30) Foreign Application Priority Data

Dec. 31, 2013 (CN) .......................... 2013 1 0754580

(51) Int. Cl.
*H02J 5/00* (2016.01)
*H02J 7/02* (2016.01)
*H02J 50/12* (2016.01)
(Continued)

(52) U.S. Cl.
CPC ............... *H02J 50/12* (2016.02); *H01Q 7/00* (2013.01); *H02J 5/005* (2013.01); *H02J 7/025* (2013.01);
(Continued)

(58) Field of Classification Search
CPC .... H02J 17/00; H02J 5/00; H02J 5/005; H02J 7/02; H02J 7/022; H02J 7/025;
(Continued)

(56) References Cited

U.S. PATENT DOCUMENTS

| 9,385,561 B2 * | 7/2016 | Sayles ..................... H02J 5/005 |
| 2011/0210621 A1 | 9/2011 | Iwaisako et al. |

(Continued)

FOREIGN PATENT DOCUMENTS

| CN | 101141081 A | 3/2008 |
| CN | 101401322 A | 4/2009 |

(Continued)

OTHER PUBLICATIONS

Song, "Vertical three-component magnetic field generator," Journal of Changchun University, vol. 20, No. 6, pp. 56-58, College of Electronic Information Engineering, Changchun University, Changchun, China (Jun. 2010).

*Primary Examiner* — Lincoln D Donovan
*Assistant Examiner* — Diana J. Cheng
(74) *Attorney, Agent, or Firm* — Leydig, Voit & Mayer, Ltd.

(57) ABSTRACT

An electricity transmission sending device includes: a transmission circuit and a coil, where the transmission circuit includes a signal sending unit and a controlling unit, and the coil includes at least two mutually perpendicular subcoils. The signal sending unit is configured to receive a required power signal and an actually received power signal that are sent by the electricity transmission receiving device; and the controlling unit is configured to adjust a magnetic field direction in which wireless electricity transmission to the electricity transmission receiving device is performed and control the coil to transmit electric energy to the electricity transmission receiving device in an optimal magnetic field direction, where the optimal magnetic field direction refers to a corresponding magnetic field direction when a power value of electric energy actually received by the electricity transmission receiving device is maximum in a case of specific output power of the coil.

8 Claims, 22 Drawing Sheets

(51) Int. Cl.
*H02J 50/40* (2016.01)
*H02J 50/90* (2016.01)
*H02J 17/00* (2006.01)
*H01Q 7/00* (2006.01)
*H04B 5/00* (2006.01)

(52) U.S. Cl.
CPC .............. *H02J 17/00* (2013.01); *H02J 50/40* (2016.02); *H02J 50/90* (2016.02); *H04B 5/0037* (2013.01); *H04B 5/0087* (2013.01)

(58) Field of Classification Search
CPC ............ H01Q 7/00; H01Q 7/005; H01Q 7/02; H01Q 7/04; H01Q 7/06; H01Q 7/08; H04B 5/0025; H04B 5/0037; H04B 5/0075; H04B 5/0087
USPC .......................................... 307/104; 320/108
See application file for complete search history.

(56) References Cited

U.S. PATENT DOCUMENTS

| | | | |
|---|---|---|---|
| 2012/0256494 A1 | 10/2012 | Kesler et al. | |
| 2013/0069587 A1 | 3/2013 | Kuk | |
| 2014/0312901 A1* | 10/2014 | Chen | .................... G01N 24/081 324/321 |

FOREIGN PATENT DOCUMENTS

| | | |
|---|---|---|
| CN | 102239633 A | 11/2011 |
| CN | 102906964 A | 1/2013 |
| WO | WO 2007084716 A2 | 7/2007 |

\* cited by examiner

Less than 90 degrees

Equal to 90 degrees

Greater than 90 degrees and less than 180 degrees

Greater than 180 degrees and less than 270 degrees

Equal to 270 degrees

Greater than 270 degrees and less than 360 degrees

ELECTRICITY TRANSMISSION SENDING METHOD AND DEVICE, AND SYSTEM

CROSS-REFERENCE TO RELATED APPLICATION

This application claims priority to Chinese Patent Application No. 201310754580.9, filed Dec. 31, 2013, which is incorporated herein by reference in its entirety.

TECHNICAL FIELD

Embodiments of the present invention relate to electricity transmission technologies, and in particular, to an electricity transmission sending method and device, and a system.

BACKGROUND

The origin of the concept of wireless electricity transmission can be traced back to 1889. With his lofty ideal of global wireless power supply, Nikola Tesla, a physicist and electrical engineer, started so that preparations for building Ed den Cliff Kobita and initiated a great challenge to a conducting wire that restricts electric energy. Since Nikola Tesla ignited the dream of human beings for wireless electricity transmission, the research on wireless electric energy transmission has been constantly moving forward. In the past century, science and technology as well as civilization developed rapidly, the electronic communications industry advanced rapidly, people made a great breakthrough in research on wireless electric energy transmission technologies, and a phantom of "obtaining electricity across space" also came true.

In the prior art, electric energy is mainly transmitted from an electricity transmission sending device to an electricity transmission receiving device by means of electromagnetic wave radiation. Specifically speaking, an electricity transmission sending device can convert an electrical signal into an electromagnetic wave signal and send the electromagnetic wave signal to an electricity transmission receiving device through space; and the electricity transmission receiving device can re-convert the electromagnetic wave signal into an electrical signal, so as to obtain electric energy.

However, the prior art allows sending electromagnetic wave radiation to an electricity transmission receiving device only in several fixed directions. In reality, an electricity transmission receiving device may not be exactly located in the several fixed directions. As a result, power of electric energy actually received by the electricity transmission receiving device is lower than power of electric energy actually received when a direction points exactly to the receiving device, causing an inefficient electric energy transmission problem.

SUMMARY

Embodiments of the present invention provide an electricity transmission sending method and device, and a system, so as to solve an inefficient electric energy transmission problem that is because, when an electricity transmission sending device performs wireless electricity transmission to an electricity transmission receiving device, power of electric energy actually received by the electricity transmission receiving device is lower than power of electric energy actually received when a direction points exactly to the receiving device.

According to a first aspect, an embodiment of the present invention provides an electricity transmission sending device, where the electricity transmission sending device is configured to perform wireless electricity transmission to an electricity transmission receiving device and the electricity transmission sending device includes an transmission circuit and a coil, where the transmission circuit includes a signal sending unit and a controlling unit, and the coil includes at least two mutually perpendicular subcoils, where:

the signal sending unit is configured to receive a required power signal and an actually received power signal that are sent by the electricity transmission receiving device, where the required power signal includes a power value of electric energy required by the electricity transmission receiving device and the actually received power signal includes a power value of electric energy actually received by the electricity transmission receiving device;

the controlling unit is configured to adjust a magnetic field direction in which wireless electricity transmission to the electricity transmission receiving device is performed, control the coil to transmit electric energy to the electricity transmission receiving device in an optimal magnetic field direction, and adjust output power of the coil, so that the power value of electric energy actually received by the electricity transmission receiving device is equal to the power value of required electric energy, where the optimal magnetic field direction refers to a corresponding magnetic field direction when a power value of electric energy actually received by the electricity transmission receiving device is maximum in a case of specific output power of the coil; and the coil is configured to generate a magnetic field and transmit, in the optimal magnetic field direction, electric energy to the electricity transmission receiving device.

With reference to the first aspect, in a first possible implementation manner of the first aspect, the controlling unit specifically includes:

a directing unit, configured to adjust an amplitude ratio and a phase difference between currents of the at least two mutually perpendicular subcoils, so as to control the magnetic field direction to perform step change and determine a corresponding magnetic field direction when the power value of the actually received electric energy is maximum in the step change process as the optimal magnetic field direction; and a power transmission unit, configured to control the coil to transmit electric energy to the electricity transmission receiving device in the optimal magnetic field direction and adjust output power of the electricity transmission sending device, so that the power value of the electric energy actually received by the electricity transmission receiving device is equal to the power value of the required electric energy.

With reference to the first possible implementation manner of the first aspect, in a second possible implementation manner of the first aspect, the directing unit includes:

a step controlling unit, configured to adjust the amplitude ratio and the phase difference between the currents of the at least two mutually perpendicular subcoils, so as to control the magnetic field direction to step towards a same direction at a fixed angle until the magnetic field direction returns to an initial position before the stepping; and a sampling and comparing unit, configured to obtain a power value of electric energy actually received by the electricity transmission receiving device before the stepping and obtain a power value of actually received electric energy, which is obtained after each stepping; compare all the obtained power values of the actually received electric energy; and determine a magnetic field direction corresponding to a maximum power value of the actually received electric energy as the optimal magnetic field direction.

With reference to the second possible implementation manner of the first aspect, in a third possible implementation manner of the first aspect, the step controlling unit includes a delayer, a direct current voltage-adjustable power source, and a high frequency inverter, where:

the high frequency inverter is configured to convert a direct current output by the direct current voltage-adjustable power source into an alternating current and then output the alternating current to the at least two mutually perpendicular subcoils;

the delayer is configured to delay a frequency driving signal, where the delayed frequency driving signal is used to generate a phase difference between the currents of the at least two mutually perpendicular subcoils, where the phase difference is used to determine a range of a two-dimensional quadrant or three-dimensional quadrant in which a direction of the magnetic field generated by the at least two coils is located; and the direct current voltage-adjustable power source is configured to output a direct current and adjust the amplitude ratio between the currents output to the at least two mutually perpendicular subcoils, so as to adjust the direction of the magnetic field generated by the coil to perform step change within the range.

According to a second aspect, an embodiment of the present invention provides an electric energy transmission system, including an electricity transmission sending device and an electricity transmission receiving device, where the electricity transmission sending device is the electricity transmission sending device according to the first aspect or any one of the first to third possible implementation manners of the first aspect and the electricity transmission sending device performs wireless electricity transmission to the electricity transmission receiving device; and the electricity transmission receiving device includes an electricity transmission receiving circuit that is configured to receive wireless electricity transmission and a receiving coil, where the receiving coil includes a signal sending unit, where the signal sending unit is configured to send a required power signal and an actually received power signal to the electricity transmission sending device; and the electricity transmission receiving circuit is configured to receive electric energy that the electricity transmission sending device transmits by means of wireless electricity transmission.

According to a third aspect, an embodiment of the present invention provides an electricity transmission sending method, including:

receiving a required power signal and an actually received power signal that are sent by an electricity transmission receiving device, where the required power signal includes a power value of electric energy required by the electricity transmission receiving device and the actually received power signal includes a power value of electric energy actually received by the electricity transmission receiving device;

adjusting a magnetic field direction in which wireless electricity transmission to the electricity transmission receiving device is performed, so as to transmit electric energy to the electricity transmission receiving device in an optimal magnetic field direction, where the optimal magnetic field direction is a corresponding magnetic field direction when a power value of electric energy actually received by the electricity transmission receiving device is maximum in a case of specific output power of the coil; and adjusting output power so that the power value of electric energy actually received by the electricity transmission receiving device in the optimal magnetic field direction is equal to the power value of required electric energy.

With reference to the third aspect, in a first possible implementation manner of the third aspect, the adjusting a magnetic field direction in which wireless electricity transmission to the electricity transmission receiving device is performed, so as to transmit electric energy to the electricity transmission receiving device in an optimal magnetic field direction includes:

adjusting, in a case of specific output power of the coil, the magnetic field direction by adjusting an amplitude ratio and a phase difference between currents of two or three mutually perpendicular subcoils, so as to cause the magnetic field direction to perform step change at a fixed angle;

determining, according to power values of actually received electric energy, which are received in the step change process of the magnetic field direction, a corresponding magnetic field direction when the power value of the electric energy actually received by the electricity transmission receiving device is maximum as the optimal magnetic field direction; and transmitting electric energy to the electricity transmission receiving device in the optimal magnetic field direction.

With reference to the first possible implementation manner of the third aspect, in a second possible implementation manner of the third aspect, the determining, according to power values of actually received electric energy, which are received in the step change process of the magnetic field direction, a corresponding magnetic field direction when the power value of the electric energy actually received by the electricity transmission receiving device is maximum as the optimal magnetic field direction, includes:

step 1: obtaining a first power value of electric energy actually received by the electricity transmission receiving device in an initial position of a current magnetic field direction;

step 2: controlling the magnetic field direction to step at the fixed angle and obtaining a second power value of actually received electric energy in an after-stepping magnetic field direction;

step 3: comparing the first power value of the actually received electric energy and the second power value of the actually received electric energy, and using a larger value between the two as a maximum power value of the actually received electric energy;

step 4: controlling the magnetic field direction to step at the fixed angle and obtaining a third power value of actually received electric energy in an after-stepping magnetic field direction;

step 5: comparing the maximum power value of the actually received electric energy and the third power value of the actually received electric energy, and using a larger value between the two as a maximum power value of the actually received electric energy; and step 6: repeating the foregoing steps 1 to 5 until the magnetic field direction returns to the initial position, and using a magnetic field direction corresponding to the maximum power value of the actually received electric energy, which is obtained in the stepping process, as the optimal magnetic field direction.

With reference to the first or second possible implementation manner of the third aspect, in a third possible implementation manner of the third aspect, the adjusting, in a case of specific output power of the coil, the magnetic field direction by adjusting an amplitude ratio and a phase difference between currents of two or three mutually perpendicular subcoils, so as to cause the magnetic field direction to perform step change at a fixed angle, includes:

adjusting a range of a two-dimensional quadrant or a three-dimensional quadrant in which the magnetic field direction is located by adjusting the phase difference; and adjusting a deflection angle of the magnetic field direction within the range by adjusting the amplitude ratio between the currents, so as to cause the magnetic field direction to perform step change at the fixed angle.

According to a fourth aspect, an embodiment of the present invention provides an electricity transmission sending apparatus, including:

a communications module, configured to receive a required power signal and an actually received power signal that are sent by an electricity transmission receiving device, where the required power signal includes a power value of electric energy required by the electricity transmission receiving device and the actually received power signal includes a power value of electric energy actually received by the electricity transmission receiving device;

an optimal electricity transmission module, configured to adjust a magnetic field direction in which wireless electricity transmission to the electricity transmission receiving device is performed, so as to transmit electric energy to the electricity transmission receiving device in an optimal magnetic field direction, where the optimal magnetic field direction is a corresponding magnetic field direction when a power value of electric energy actually received by the electricity transmission receiving device is maximum in a case of specific output power of the coil; and an electric energy transmission module, configured to adjust output power of the coil so that the power value of electric energy actually received by the electricity transmission receiving device in the optimal magnetic field direction is equal to the power value of required electric energy.

With reference to the fourth aspect, in a first possible implementation manner of the fourth aspect, the optimal electricity transmission module includes:

an adjusting unit, configured to adjust, in a case of specific output power of the coil, the magnetic field direction by adjusting an amplitude ratio and a phase difference between currents of two or three mutually perpendicular subcoils, so as to cause the magnetic field direction to perform step change at a fixed angle;

a direction determining unit, configured to determine, according to power values of actually received electric energy, which are received in the step change process of the magnetic field direction, a corresponding magnetic field direction when the power value of the electric energy actually received by the electricity transmission receiving device is maximum as the optimal magnetic field direction; and an electricity transmission unit, configured to transmit electric energy to the electricity transmission receiving device in the optimal magnetic field direction and adjust output power of the coil, so that the power value of electric energy actually received by the electricity transmission receiving device is equal to the power value of required electric energy.

With reference to the first possible implementation manner of the fourth aspect, in a second possible implementation manner of the fourth aspect, the direction determining unit includes:

a cyclic stepping unit, configured to control the magnetic field direction to step towards a same direction at the fixed angle until the magnetic field direction returns to an initial position; and a comparing and determining unit, configured to obtain a power value of electric energy actually received by the electricity transmission receiving device before the stepping and obtain a power value of actually received electric energy, which is obtained after each stepping; compare all the obtained power values of the actually received electric energy; and determine a magnetic field direction corresponding to a maximum power value of the actually received electric energy as the optimal magnetic field direction.

With reference to the first or second possible implementation manner of the fourth aspect, in a third possible implementation manner of the fourth aspect, the adjusting unit is specifically configured to:

adjust a range of a two-dimensional quadrant or a three-dimensional quadrant in which the magnetic field direction is located by adjusting the phase difference; and adjust a deflection angle of the magnetic field direction within the range by adjusting the amplitude ratio between the currents, so as to cause the magnetic field direction to perform step change at the fixed angle.

According to the electricity transmission sending method and device, and the system provided by the embodiments of the present invention, the amplitude ratio and the phase difference between the currents of the at least two mutually perpendicular subcoils are adjusted, so as to adjust the magnetic field direction generated by the coil to the optimal magnetic field direction, that is, when the electricity transmission sending device performs wireless electricity transmission to the electricity transmission receiving device in the optimal magnetic field direction, the power value of the electric energy actually received by the electricity transmission receiving device is maximum, which solves an inefficient electric energy transmission problem.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
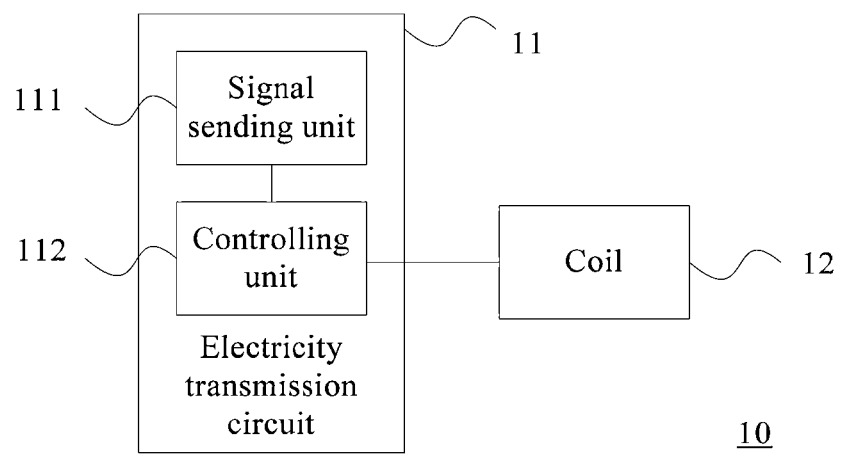
FIG. 1 is a schematic structural diagram of Embodiment 1 of an electricity transmission sending device according to the present invention.

FIG. 1 is a schematic structural diagram of Embodiment 1 of an electricity transmission sending device according to the present invention. As shown in FIG. 1, the electricity transmission sending device 10 is configured to perform wireless electricity transmission to an electricity transmission receiving device. The device provided by this embodiment may include a transmission circuit 11 and a coil 12. Further, the transmission circuit 11 may further include a signal sending unit 111 and a controlling unit 112; and the coil 12 includes at least two mutually perpendicular subcoils. The signal sending unit 111 is configured to receive a required power signal and an actually received power signal that are sent by the electricity transmission receiving device, where the required power signal includes a power value of electric energy required by the electricity transmission receiving device and the actually received power signal includes a power value of electric energy actually received by the electricity transmission receiving device. The controlling unit 112 is configured to adjust a magnetic field direction in which wireless electricity transmission to the electricity transmission receiving device is performed, control the coil 12 to transmit electric energy to the electricity transmission receiving device in an optimal magnetic field direction, and adjust output power of the coil 12, so that the power value of electric energy actually received by the electricity transmission receiving device is equal to the power value of required electric energy, where the optimal magnetic field direction refers to a corresponding magnetic field direction when a power value of electric energy actually received by the electricity transmission receiving device is maximum in a case of specific output power of the coil 12. The coil 12 is configured to generate a magnetic field and transmit, in the optimal magnetic field direction, electric energy to the electricity transmission receiving device.

Figure 2A:
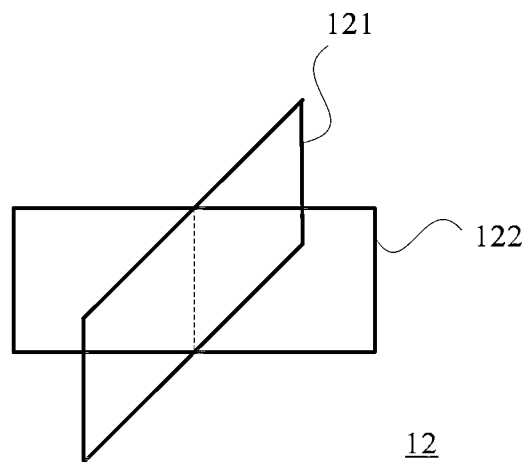
FIG. 2A is a schematic diagram of a combination of two mutually perpendicular subcoils in Embodiment 1 of the electricity transmission sending device according to the present invention.
Figure 2B:
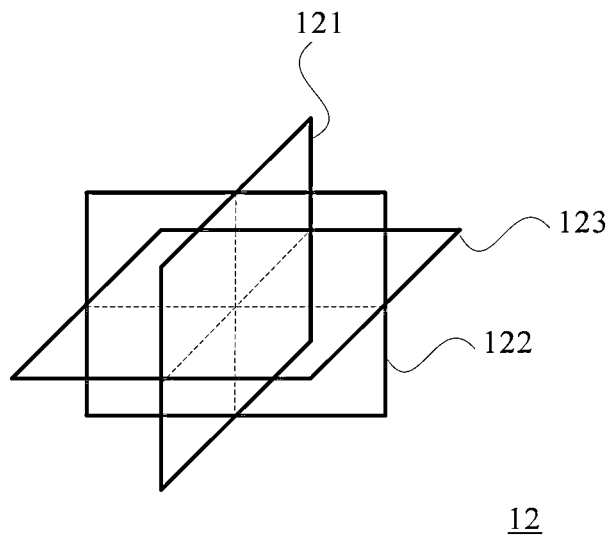
FIG. 2B is a schematic diagram of a combination of three mutually perpendicular subcoils in Embodiment 1 of the electricity transmission sending device according to the present invention.

FIG. 2A is a schematic diagram of a combination of two mutually perpendicular subcoils in Embodiment 1 of the electricity transmission sending device according to the present invention. As shown in FIG. 2A, the coil 12 includes two subcoils 121 and 122, where the subcoil 121 and the subcoil 122 are mutually perpendicular. FIG. 2B is a schematic diagram of a combination of three mutually perpendicular subcoils in Embodiment 1 of the electricity transmission sending device according to the present invention. As shown in FIG. 2B, the coil 12 includes three subcoils 121, 122, and 123, where each two of the subcoil 121, the subcoil 122, and the subcoil 123 are mutually perpendicular. It should be noted that FIG. 2A and FIG. 2B show combination examples only of mutually perpendicular subcoils. The coil in the present invention may be an orthogonal coil combined in any form, which is not specifically limited herein.

The electricity transmission sending device 10 transmits electric energy to the electricity transmission receiving device in the optimal magnetic field direction by adjusting a direction of the magnetic field generated by the coil. An implementation principle of a magnetic field generated by a coil is specifically as follows: according to the Ampere's circuital law (a phenomenon of current magnetic effect), a magnetic field is generated around a coil through which a current flows, where magnetic field strength is in direct proportion to a current magnitude, a magnetic field direction is perpendicular to a current direction, and a method for determining a magnetic field direction is the right-hand rule. Directions of magnetic fields generated by mutually perpendicular subcoils in a coil are synthesized according to a triangle law to form a magnetic field direction of the coil.

In this embodiment, the electricity transmission sending device 10 adjusts an amplitude ratio and a phase difference between currents of the at least two mutually perpendicular subcoils, so as to adjust the direction of the magnetic field generated by the coil to the optimal magnetic field direction, that is, when the electricity transmission sending device 10 performs wireless electricity transmission to the electricity transmission receiving device in the optimal magnetic field direction, the power value of the electric energy actually received by the electricity transmission receiving device is maximum, which solves an inefficient electric energy transmission problem.

Figure 3:
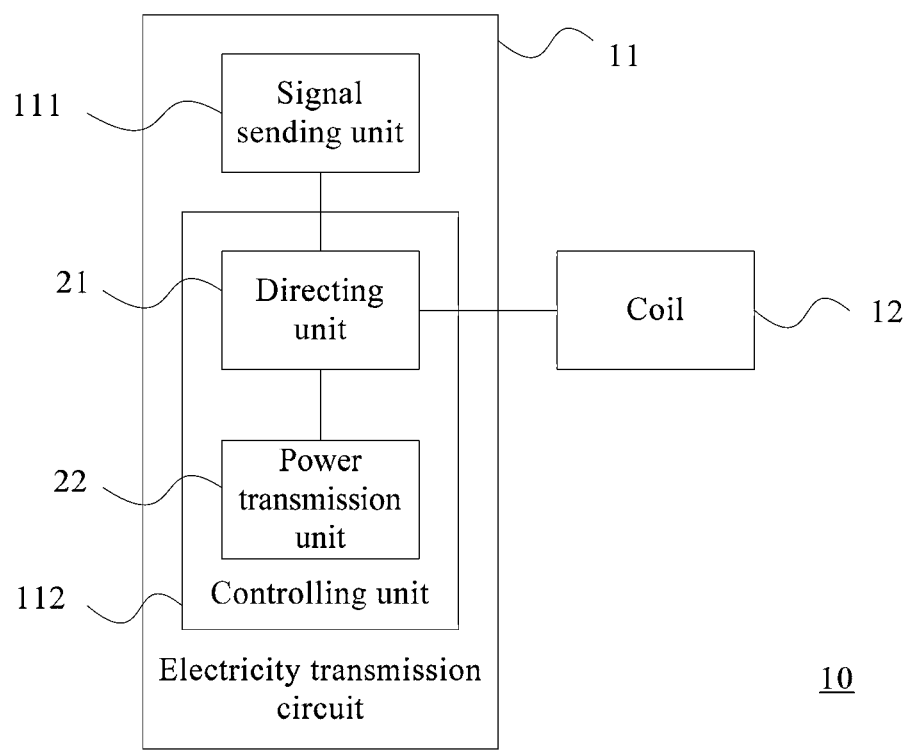
FIG. 3 is a schematic structural diagram of Embodiment 2 of an electricity transmission sending device according to the present invention.

FIG. 3 is a schematic structural diagram of Embodiment 2 of an electricity transmission sending device according to the present invention. As shown in FIG. 3, the electricity transmission sending device provided by this embodiment is based on the device structure shown in FIG. 1. Further, the controlling unit 112 may include a directing unit 21 and a power transmission unit 22. The directing unit 21 is configured to adjust an amplitude ratio and a phase difference between currents of the at least two mutually perpendicular subcoils, so as to control the magnetic field direction to perform step change and determine a corresponding magnetic field direction when the power value of the actually received electric energy is maximum in the step change process as the optimal magnetic field direction. The power transmission unit 22 is configured to control the coil to transmit electric energy to the electricity transmission receiving device in the optimal magnetic field direction and adjust output power of the electricity transmission sending device, so that the power value of the electric energy actually received by the electricity transmission receiving device is equal to the power value of the required electric energy.

In this embodiment, the controlling unit 112 of the electricity transmission sending device 10 controls the magnetic field direction to perform step change and gradually finds, according to comparison of power of the electric energy actually received by the electricity transmission receiving device in the step change process, a corresponding direction when the power value of the electric energy actually received by the electricity transmission receiving device is maximum. In this case, the electricity transmission sending device keeps transmitting electric energy to the electricity transmission receiving device in the direction, which can reduce an electric energy loss in a transmission path and improve the electric energy transmission efficiency.

Figure 4:
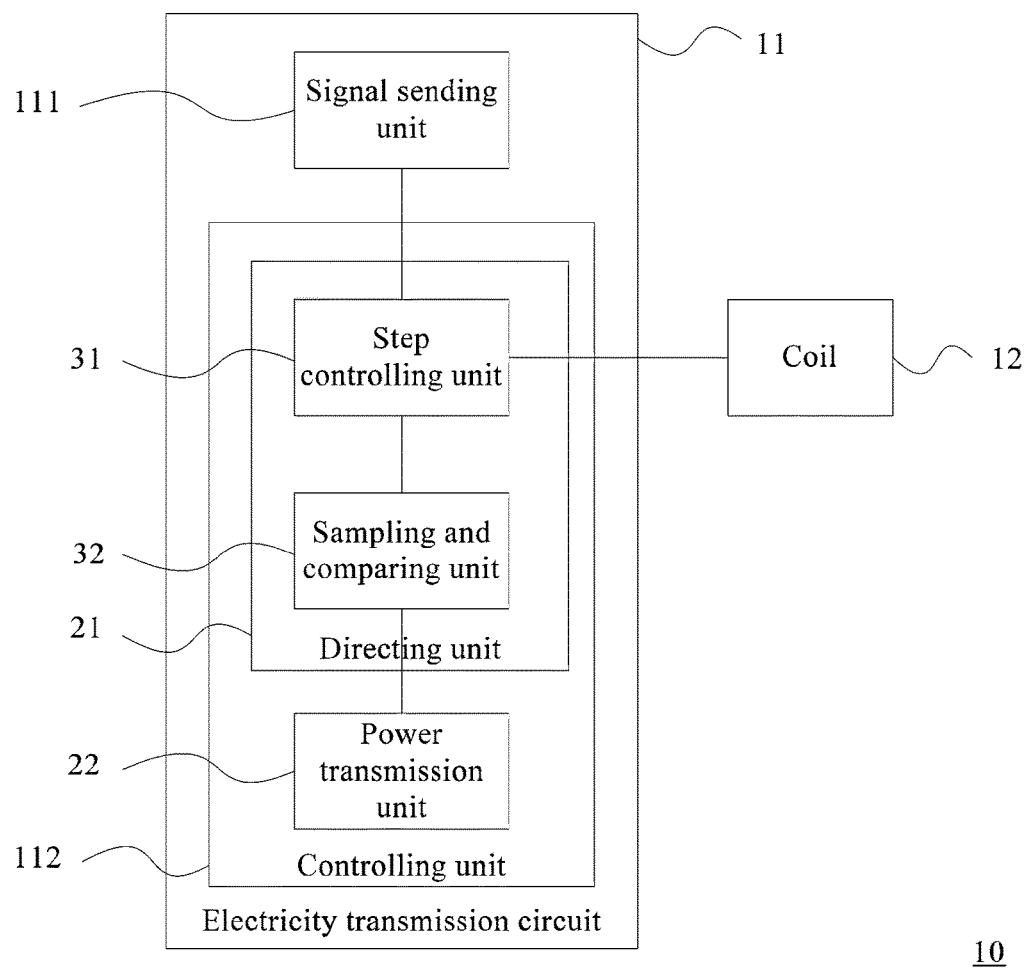
FIG. 4 is a schematic structural diagram of Embodiment 3 of an electricity transmission sending device according to the present invention.

FIG. 4 is a schematic structural diagram of Embodiment 3 of an electricity transmission sending device according to the present invention. As shown FIG. 4, the electricity transmission sending device provided by this embodiment is based on the device structure shown in FIG. 3. Further, the directing unit 21 may include a step controlling unit 31 and a sampling and comparing unit 32. The step controlling unit 31 is configured to adjust the amplitude ratio and the phase difference between the currents of the at least two mutually perpendicular subcoils, so as to control the magnetic field direction to step towards a same direction at a fixed angle until the magnetic field direction returns to an initial position before the stepping. The sampling and comparing unit 32 is configured to obtain a power value of electric energy actually received by the electricity transmission receiving device before the stepping and obtain a power value of actually received electric energy, which is obtained after each stepping; compare all the obtained power values of the actually received electric energy; and determine a magnetic field direction corresponding to a maximum power value of the actually received electric energy as the optimal magnetic field direction.

In this embodiment, the directing unit 21 of the controlling unit 112 of the electricity transmission sending device 10 controls the magnetic field direction to step towards the same direction at the fixed angle, repeatedly compares, in the step change process, power values of the electric energy actually received by the electricity transmission receiving device, and finally determines an optimal magnetic field direction, thereby achieving a purpose of improving the electric energy transmission efficiency.

Figure 5:
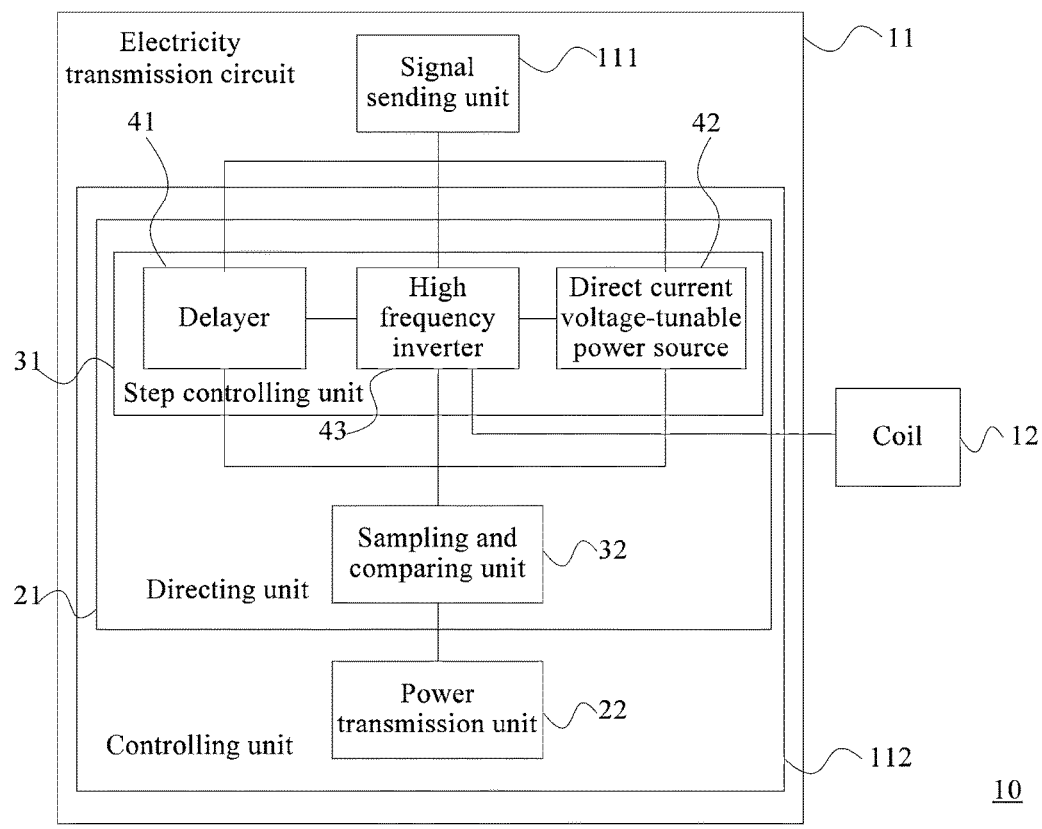
FIG. 5 is a schematic structural diagram of Embodiment 4 of an electricity transmission sending device according to the present invention.

FIG. 5 is a schematic structural diagram of Embodiment 4 of an electricity transmission sending device according to the present invention. As shown in FIG. 5, based on the device structure shown in FIG. 4, the step controlling unit 31 may further include a delayer 41, a direct current voltage-adjustable power source 42, and a high frequency inverter 43. The high frequency inverter 43 is configured to convert a direct current output by the direct current voltage-adjustable power source into an alternating current and then output the alternating current to the at least two mutually perpendicular subcoils. The delayer 41 is configured to delay a frequency driving signal, where the delayed frequency driving signal is used to generate a phase difference between the currents of the at least two mutually perpendicular subcoils, where the phase difference is used to determine a range of a two-dimensional quadrant or a three-dimensional quadrant in which a direction of the magnetic field generated by the at least two coils is located. The direct current voltage-adjustable power source 42 is configured to output a direct current and adjust the amplitude ratio between the currents output to the at least two mutually perpendicular subcoils, so as to adjust the direction of the magnetic field generated by the coil to perform step change within the range.

Specifically, according to the number of subcoils included in the coil and a method for adjusting a magnetic field direction, quantities of delayers 41, direct current voltage-adjustable power sources 42, and high frequency inverters 43 included in the step controlling unit 31 and a circuit connection manner may be adjusted based on an actual requirement.

Figure 6:
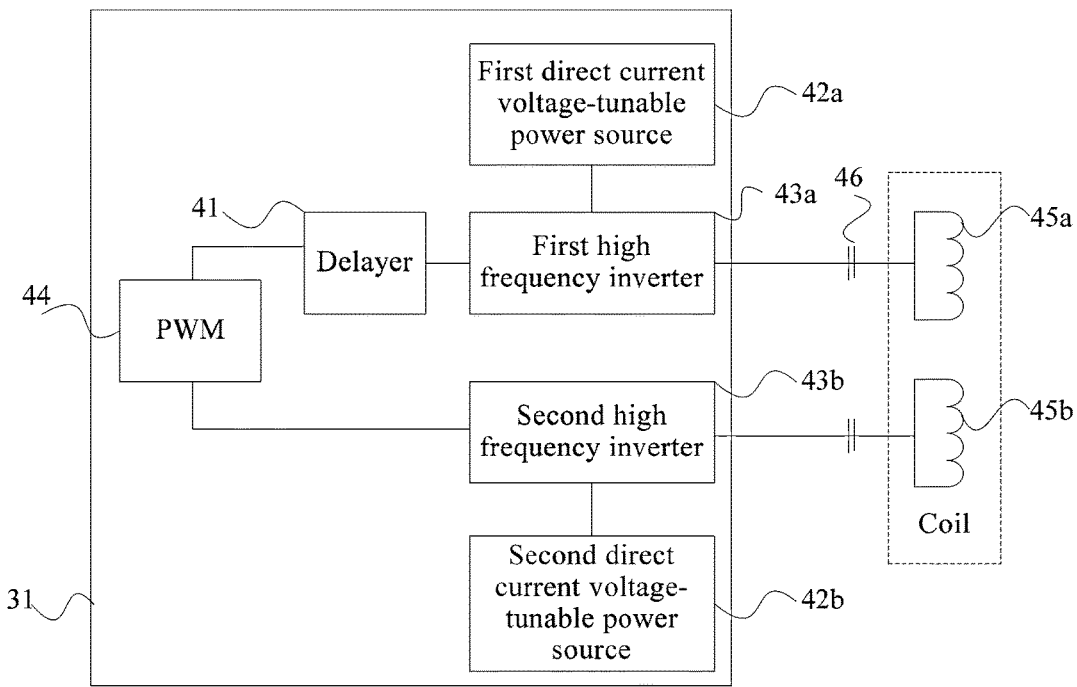
FIG. 6 is a first schematic diagram of a partial structure of Embodiment 4 of the electricity transmission sending device according to the present invention.

FIG. 6 is a first schematic diagram of a partial structure of Embodiment 4 of the electricity transmission sending device according to the present invention. As shown in FIG. 6, the manner in which the step controlling unit 31 and the coil are connected in FIG. 5 is related to the number of coils and the method for generating a magnetic field direction. The coil includes a first subcoil 45a and a second subcoil 45b that are mutually perpendicular, and a capacitor 46. Accordingly, in this embodiment, the step controlling unit 31 in the device structure shown in FIG. 5 may include a first direct current voltage-adjustable power source 42a, a second direct current voltage-adjustable power source 42b, a first high frequency inverter 43a, a second high frequency inverter 43b, the delayer 41, and a pulse width modulator (Pulse Width Modulation, PWM for short) 44. The first direct current voltage-adjustable power source 42a and the first high frequency inverter 43a are configured to control a current of the first subcoil 45a, the second direct current voltage-adjustable power source 42b and the second high frequency inverter 43b are configured to control a current of the second subcoil 45b, and the delayer 41 is configured to generate a delay of the current of the first subcoil 45a, so as to generate a phase difference between the currents of the two mutually perpendicular subcoils. In the structure shown in FIG. 6, the phase difference may be adjusted to 0° or 180°. The currents of the two subcoils are either forward or backward. When the currents of the two subcoils are forward, a magnetic field direction is located in the first or third quadrant. When the currents of the two subcoils are backward, a magnetic field direction is located in the second or fourth quadrant. A amplitude ratio between the currents may be adjusted to any ratio, for example, 1:2, 3:1, or 1:−2. Each ratio corresponds to a deflection angle of the magnetic field direction in the foregoing quadrant in which the magnetic field direction is located. Therefore, change in the magnetic field direction of the electricity transmission sending device can be implemented in any direction.

Figure 7:
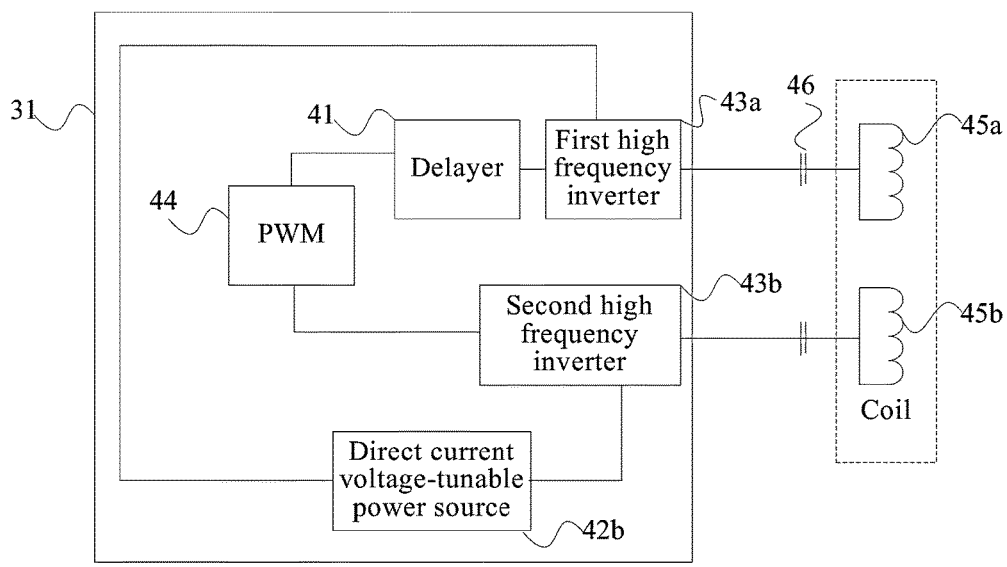
FIG. 7 is a second schematic diagram of a partial structure of Embodiment 4 of the electricity transmission sending device according to the present invention.

FIG. 7 is a second schematic diagram of a partial structure of Embodiment 4 of the electricity transmission sending device according to the present invention. As shown in FIG. 7, the manner in which the step controlling unit 31 and the coil are connected in FIG. 5 is related to the number of coils and the method for generating a magnetic field direction. The coil includes the first subcoil 45a and the second subcoil 45b that are mutually perpendicular, and the capacitor 46. Accordingly, in this embodiment, the step controlling unit 31 in the device structure shown in FIG. 5 may include the direct current voltage-adjustable power source 42, the first high frequency inverter 43a, the second high frequency inverter 43b, the delayer 41, and the PWM 44. The first high frequency inverter 43a is configured to control a current of the first subcoil 45a, the second high frequency inverter 43b is configured to control a current of the second subcoil 45b, the direct current voltage-adjustable power source 42 is configured to cause an amplitude ratio between the currents of the two subcoils to be 1:1, and the delayer 41 is configured to generate a delay of the current of the first subcoil 45a, so as to generate a phase difference between the currents of the two mutually perpendicular subcoils. In the structure shown in FIG. 7, the phase difference may be adjusted within any planar angle range except 0° or 180°. According to different phase differences, durations in which the magnetic field direction stays in four two-dimensional quadrants are different. In addition, the magnetic field direction may periodically change in the four quadrants as time changes. The amplitude ratio between the currents is 1:1, which enables even distribution of the magnetic field direction in any quadrant. Therefore, change of the magnetic field direction of the electricity transmission sending device can be implemented in any direction.

Figure 8:
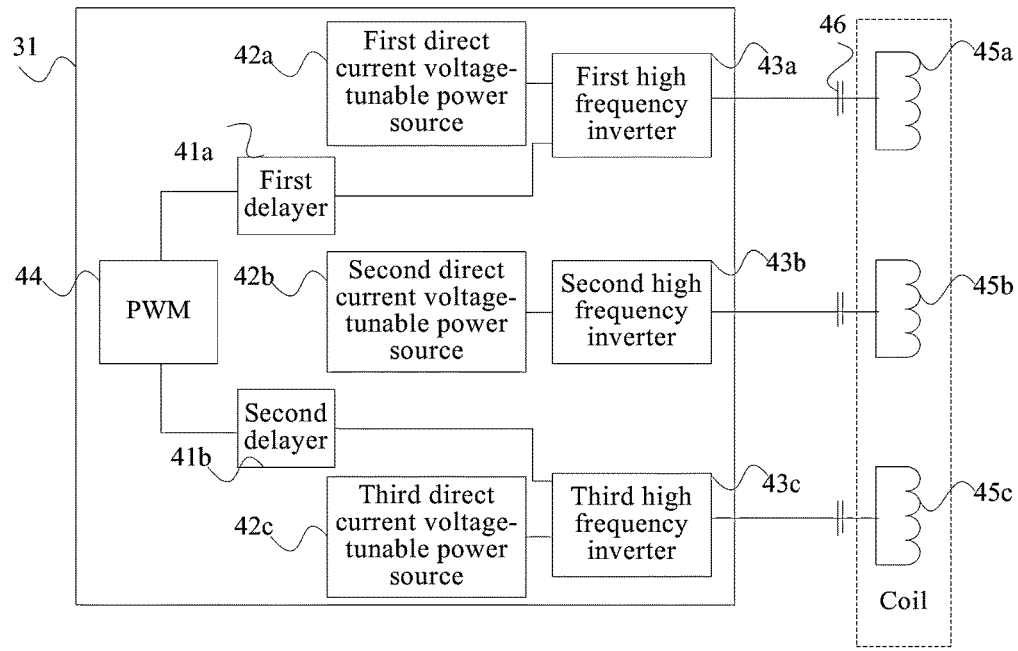
FIG. 8 is a third schematic diagram of a partial structure of Embodiment 4 of the electricity transmission sending device according to the present invention.

FIG. 8 is a third schematic diagram of a partial structure of Embodiment 4 of the electricity transmission sending device according to the present invention. As shown in FIG. 8, the manner in which the step controlling unit 31 and the coil are connected in FIG. 5 is related to the number of coils and the method for generating a magnetic field direction. The coil includes the first subcoil 45a, the second subcoil 45b, and a third subcoil 45c that are mutually perpendicular, and the capacitor 46. Accordingly, in this embodiment, the step controlling unit 31 in the device structure shown in FIG. 5 may include the first direct current voltage-adjustable power source 42a, the second direct current voltage-adjustable power source 42b, a third direct current voltage-adjustable power source 42c, the first high frequency inverter 43a, the second high frequency inverter 43b, a third high frequency inverter 43c, the delayer 41a, a second delayer 41b, and the PWM 44. The first direct current voltage-adjustable power source 42a and the first high frequency inverter 43a are configured to control a current of the first subcoil 45a, the second direct current voltage-adjustable power source 42b and the second high frequency inverter 43b are configured to control a current of the second subcoil 45b, the third direct current voltage-adjustable power source 42c and the third high frequency inverter 43c are configured to control a current of the third subcoil 45c, the first delayer 41a is configured to generate a delay of the current of the first subcoil 45a, and the second delayer 41b is configured to generate a delay of the current of the third subcoil 45c, so as to generate a phase difference between currents of the three mutually perpendicular subcoils. In the structure shown in FIG. 8, the phase difference may be adjusted to 0° or 180°. Currents of each two subcoils in the three subcoils are either forward or backward. According to a combination of a forward current and a direction, a range of a three-dimensional quadrant where a magnetic field direction is located can be determined. An amplitude ratio between the currents may be adjusted to any ratio, for example, 1:2:1, 3:1:1, or 1:−2:1. Each ratio corresponds to a deflection angle of a magnetic field direction in the foregoing quadrant in which the magnetic field direction is located. Therefore, change of the magnetic field direction of the electricity transmission sending device can be implemented in any direction.

Figure 9:
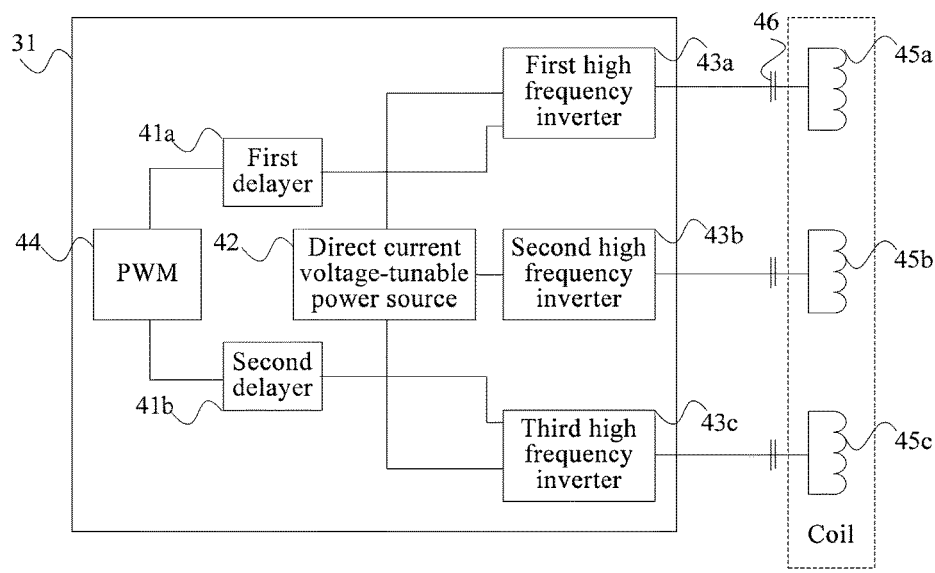
FIG. 9 is a fourth schematic diagram of a partial structure of Embodiment 4 of the electricity transmission sending device according to the present invention.

FIG. 9 is a fourth schematic diagram of a partial structure of Embodiment 4 of the electricity transmission sending device according to the present invention. As shown in FIG. 9, the manner in which connecting the step controlling unit 31 and the coil are connected in FIG. 5 is related to the number of coils and the method for generating a magnetic field direction. The coil includes the first subcoil 45a, the second subcoil 45b, and the third subcoil 45c that are mutually perpendicular, and the capacitor 46. Accordingly, in this embodiment, the step controlling unit 31 in the device structure shown in FIG. 5 may include the direct current voltage-adjustable power source 42, the first high frequency inverter 43a, the second high frequency inverter 43b, the third high frequency inverter 43c, the first delayer 41a, the second delayer 41b, and the PWM 44. The first high frequency inverter 43a is configured to control a current of the first subcoil 45a, the second high frequency inverter 43b is configured to control a current of the second subcoil 45b, the third high frequency inverter 43c is configured to control a current of the third subcoil 45c, the direct current voltage-adjustable power source 42 is configured to cause an amplitude ratio between the currents of the three subcoils to be 1:1:1, the first delayer 41a is configured to generate a delay of the current of the first subcoil 45a, and the second delayer 41b is configured to generate a delay of the current of the third subcoil 45c, so as to generate a phase difference between the currents of the three mutually perpendicular subcoils. In the structure shown in FIG. 9, the phase difference between the currents of each two subcoils may be adjusted within any planar angle range except 0° or 180°. According to different phase differences, durations in which the magnetic field direction stays in eight three-dimensional quadrants are different. In addition, the magnetic field direction may periodically change in the eight quadrants as time changes. The amplitude ratio between the currents is 1:1:1, which enables even distribution of the magnetic field direction in any quadrant. Therefore, change of the magnetic field direction of the electricity transmission sending device can be implemented in any direction.

The following uses specific exemplary drawings to describe a process of adjusting, by the electricity transmission sending device 10, the amplitude ratio and the phase difference between the currents of the at least two mutually perpendicular subcoils to adjust the direction of the magnetic field generated by the coil.

Method 1

Figure 10A:
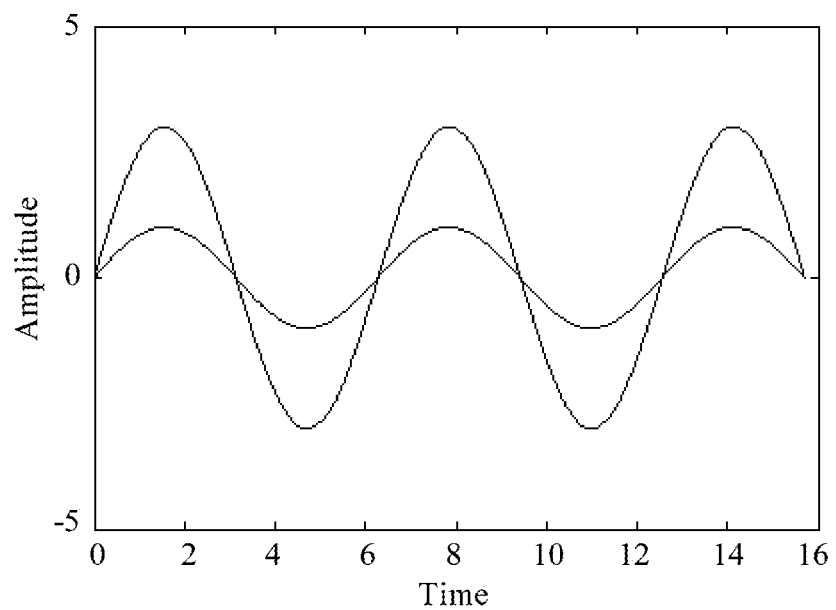
FIG. 10A is a schematic diagram of same phase in Method 1 for adjusting a magnetic field direction by an electricity transmission sending device according to the present invention.
Figure 10B:
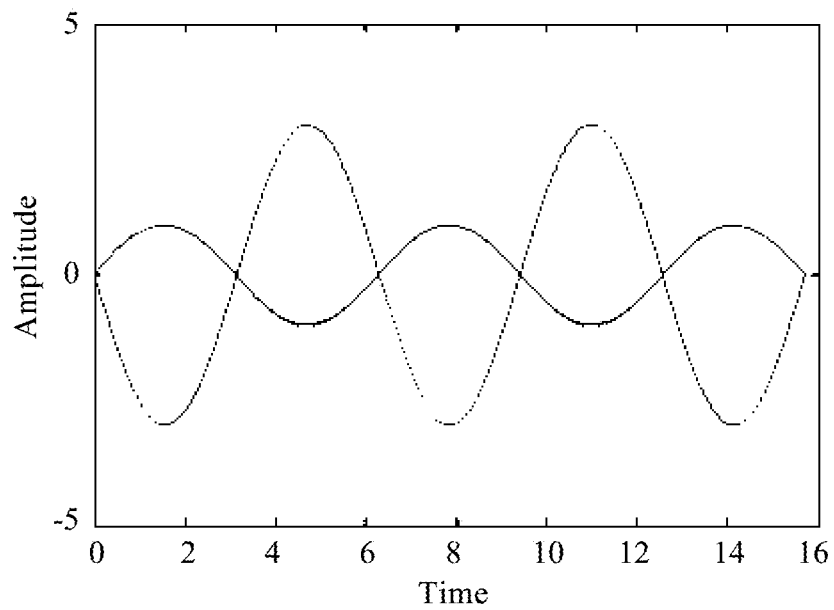
FIG. 10B is a schematic diagram of opposite phases in Method 1 for adjusting a magnetic field direction by the electricity transmission sending device according to the present invention.

FIG. 10A is a schematic diagram of same phase in Method 1 for adjusting the magnetic field direction by the electricity transmission sending device according to the present invention. FIG. 10B is a schematic diagram of opposite phases in Method 1 for adjusting the magnetic field direction by the electricity transmission sending device according to the present invention. With reference to FIG. 10A and FIG. 10B, a phase difference between currents flowing through two mutually perpendicular subcoils is set to 0° or 180°, corresponding to a same phase or opposite phases respectively. As time changes, the currents of the two subcoils always keep the same or opposite phases.

The following can be obtained according to the Biot-Savart Law in magnetic field theories:

$$\vec{A}(r) = \frac{u_0}{4\pi}\int_l \frac{I(\vec{r}')}{|\vec{r}-\vec{r}'|}dl' \qquad (2)$$
$$= \frac{u_0 I}{4\pi}\int_l \frac{\vec{dl'}}{|\vec{r}-\vec{r}'|}$$

$$\vec{B} = \nabla \times \vec{A}(r) \qquad (3)$$

According to formulas (2) and (3), a magnetic field strength is in direct proportion to a current magnitude and a direction of a magnetic field is controlled by a current direction.

Figure 11A:
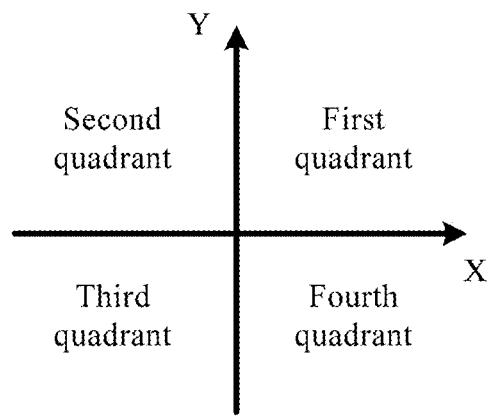
FIG. 11A is a schematic diagram of magnetic field quadrants of Method 1 for adjusting a magnetic field direction by the electricity transmission sending device according to the present invention.
Figure 11B:
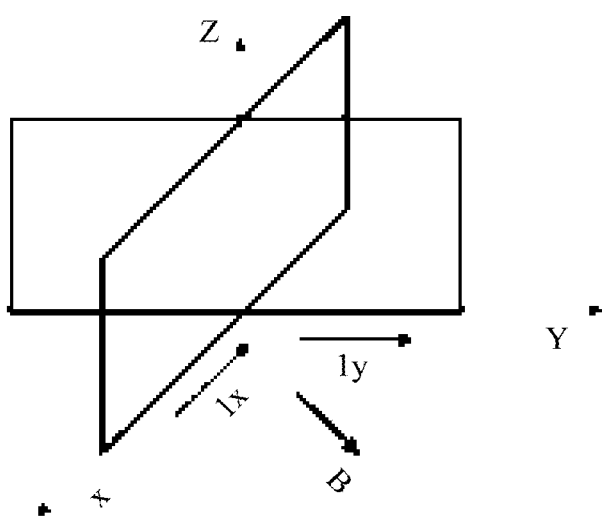
FIG. 11B is a schematic diagram of an in-phase magnetic field of Method 1 for adjusting a magnetic field direction by the electricity transmission sending device according to the present invention.
Figure 11C:
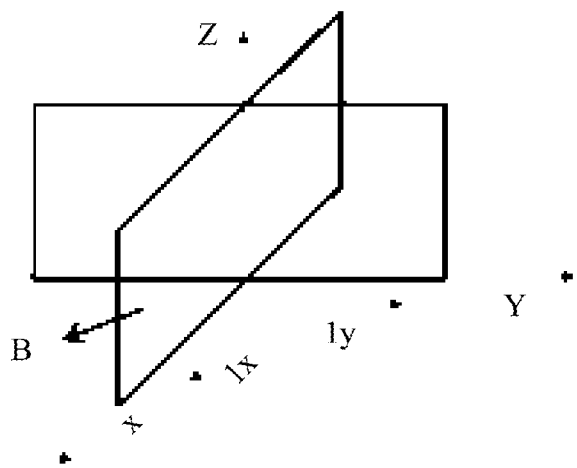
FIG. 11C is a schematic diagram of an opposite-phase magnetic field of Method 1 for adjusting a magnetic field direction by the electricity transmission sending device according to the present invention.

FIG. 11A is a schematic diagram of magnetic field quadrants of Method 1 for adjusting the magnetic field direction by the electricity transmission sending device according to the present invention. FIG. 11B is a schematic diagram of an in-phase magnetic field of Method 1 for adjusting the magnetic field direction by the electricity transmission sending device according to the present invention. FIG. 11C is a schematic diagram of an opposite-phase magnetic field of Method 1 for adjusting the magnetic field direction by the electricity transmission sending device according to the present invention. As shown in FIG. 11A, an X-axis and a Y-axis that are mutually perpendicular divide a plane into four quadrants. As shown in FIG. 11B, according to the right-hand rule, a direction of a magnetic field generated by a current Ix points to a positive direction of the Y-axis; a direction of a magnetic field generated by a current Iy points to a positive direction of the X-axis; and in this case, a magnetic field direction B is in the first quadrant. As shown in FIG. 11C, according to the right-hand rule, a direction of a magnetic field generated by a current Ix points to a negative direction of the Y-axis; a direction of a magnetic field generated by a current Iy points to a positive direction of the X-axis; and in this case, a magnetic field direction B is in the fourth quadrant.

Figure 12A:
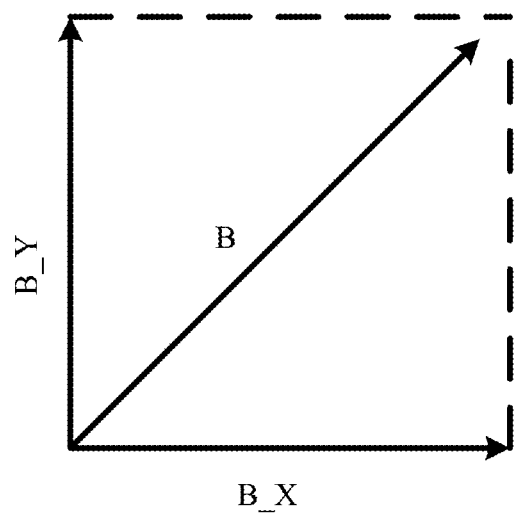
FIG. 12A is a first schematic diagram of current amplitudes of Method 1 for adjusting a magnetic field direction by the electricity transmission sending device according to the present invention.
Figure 12B:
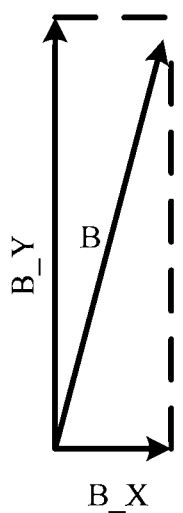
FIG. 12B is a second schematic diagram of current amplitudes of Method 1 for adjusting a magnetic field direction by the electricity transmission sending device according to the present invention.
Figure 12C:
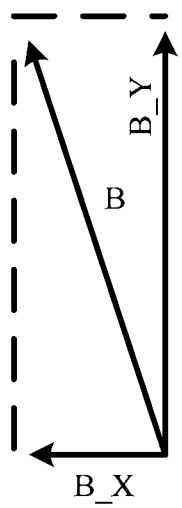
FIG. 12C is a third schematic diagram of current amplitudes of Method 1 for adjusting a magnetic field direction by the electricity transmission sending device according to the present invention.

FIG. 12A is a first schematic diagram of current amplitudes of Method 1 for adjusting the magnetic field direction by the electricity transmission sending device according to the present invention. FIG. 12B is a second schematic diagram of current amplitudes of Method 1 for adjusting the magnetic field direction by the electricity transmission sending device according to the present invention. FIG. 12C is a third schematic diagram of current amplitudes of Method 1 for adjusting the magnetic field direction by the electricity transmission sending device according to the present invention. As shown in FIG. 12A, when the current Ix and the current Iy have equal amplitudes and a same phase, peak strength values of a magnetic field B_x generated by the current Ix and a magnetic field B_y generated by the current Iy are also the same. Therefore, a magnetic field direction is in the first quadrant, and more precisely, in a direction clockwise deviated from a direction of the magnetic field B_y by an angle of 45°. As shown in FIG. 12B, when the current Ix and the current Iy have an amplitude ratio of 1:2 and a same phase, a peak strength ratio of the magnetic field B_x generated by the current Ix to the magnetic field B_y generated by the current Iy is also 1:2. Therefore, a magnetic field direction is in the first quadrant, and more precisely, in a direction clockwise deviated from a direction of the magnetic field B_y by an angle of 30°. As shown in FIG. 12C, when the current Ix and the current Iy have an amplitude ratio of 1:2 and opposite phases, a peak strength ratio of the magnetic field B_x generated by the current Ix to the magnetic field B_y generated by the current Iy is also 1:2. Therefore, a magnetic field direction is in the second quadrant, and more precisely, in a direction counter-clockwise deviated from a direction of the magnetic field B_y by an angle of 30°.

Figure 12D:
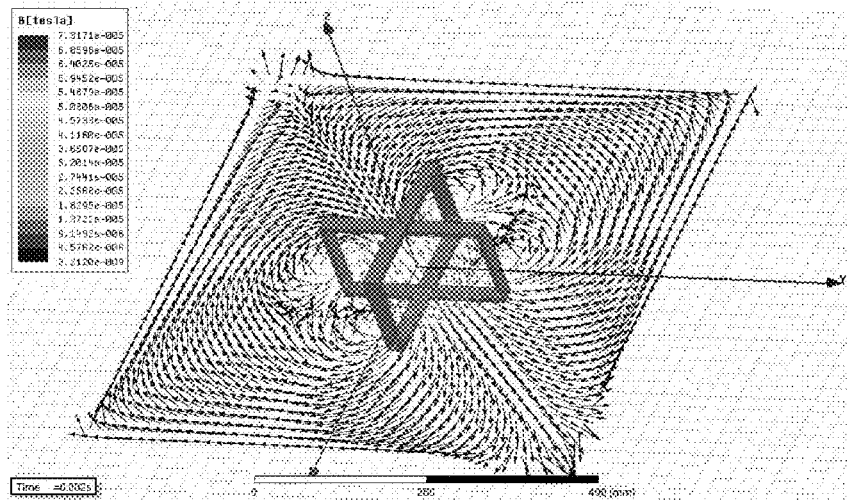
FIG. 12D is a first diagram of magnetic field emulation for Method 1 for adjusting a magnetic field direction by the electricity transmission sending device according to the present invention.
Figure 12E:
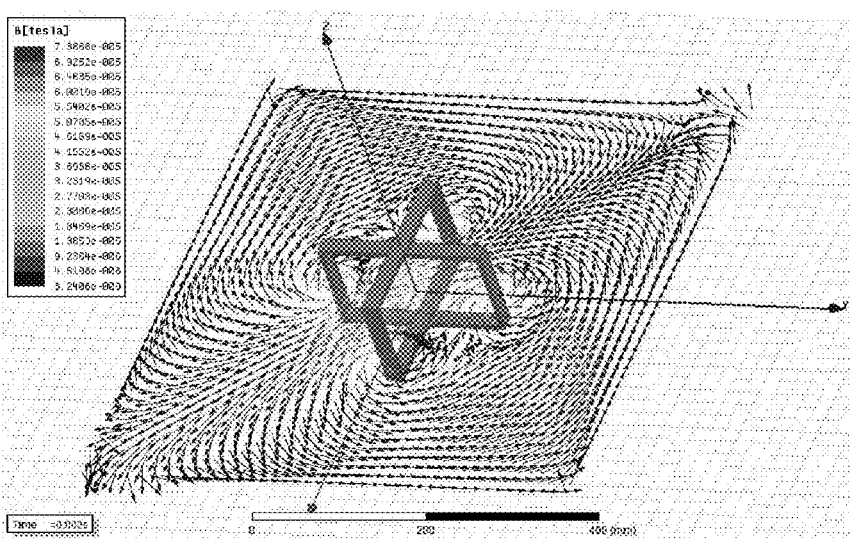
FIG. 12E is a second diagram of magnetic field emulation for Method 1 for adjusting a magnetic field direction by the electricity transmission sending device according to the present invention.
Figure 12F:
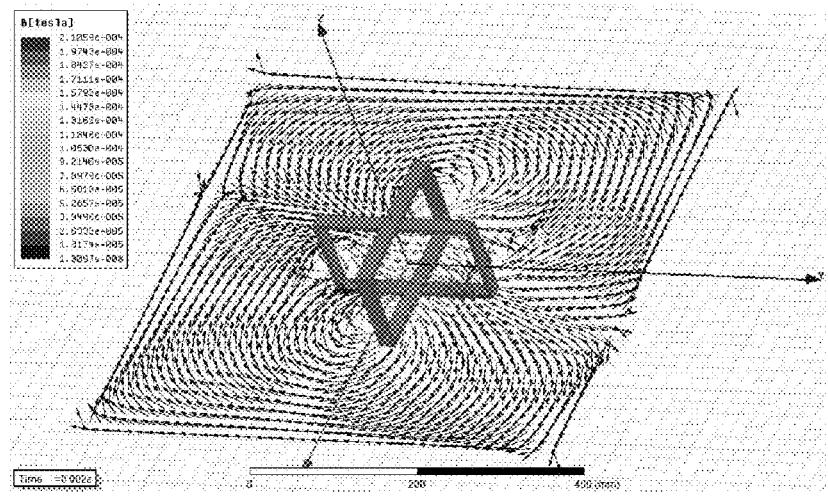
FIG. 12F is a third diagram of magnetic field emulation for Method 1 for adjusting a magnetic field direction by the electricity transmission sending device according to the present invention.
Figure 12G:
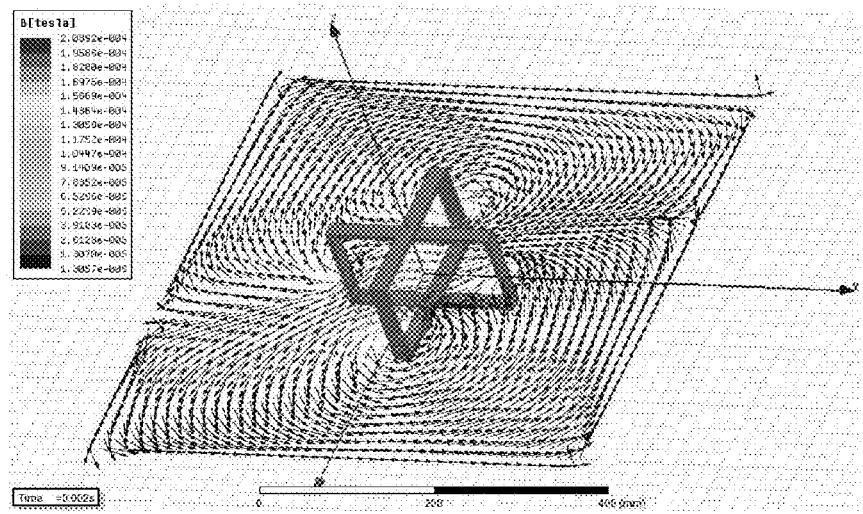
FIG. 12G is a fourth diagram of magnetic field emulation for Method 1 for adjusting a magnetic field direction by the electricity transmission sending device according to the present invention.

Emulation software may be used to obtain magnetic field distribution in a case of different amplitude ratios between currents. The following uses several examples to specifically indicate distribution of a synthesized magnetic field. FIG. 12D is a first diagram of magnetic field emulation for Method 1 for adjusting the magnetic field direction by the electricity transmission sending device according to the present invention. FIG. 12E is a second diagram of magnetic field emulation for Method 1 for adjusting the magnetic field direction by the electricity transmission sending device according to the present invention. FIG. 12F is a third diagram of magnetic field emulation for Method 1 for adjusting the magnetic field direction by the electricity transmission sending device according to the present invention. FIG. 12G is a fourth diagram of magnetic field emulation for Method 1 for adjusting the magnetic field direction by the electricity transmission sending device according to the present invention. As shown in FIG. 12D, an amplitude ratio of the current Ix to the current Iy is 1:1, indicating that the currents are in a same phase. As shown in FIG. 12E, an amplitude ratio of the current Ix to the current Iy is 1:−1, indicating that the currents are in opposed phases. As shown in FIG. 12F, an amplitude ratio of the current Ix to the current Iy is 3:1, indicating that the currents are in a same phase. As shown in FIG. 12G, an amplitude ratio of the current Ix to the current Iy is 3:−1, indicating that the currents are in opposed phases.

It can be learned that a magnetic field direction can be controlled to be in the first or third quadrant by adjusting currents flowing through two mutually perpendicular subcoils to be in a same phase, or a magnetic field direction can be controlled to be in the second or fourth quadrant by adjusting currents flowing through two mutually perpendicular subcoils to be in opposite phases; and then the magnetic field direction can be controlled in a more precise direction by adjusting a ratio between or values of amplitudes of the currents flowing through the two mutually perpendicular subcoils. FIG. 10A to FIG. 12C are schematic diagrams of Method 1 for adjusting the magnetic field direction by the electricity transmission sending device. By using the method, a magnetic field direction can be precisely controlled to fall within a planar angle range and even in any direction within three-dimensional space. In a magnetic field direction, a strongest electromagnetic wave is radiated by the electricity transmission sending device, and a largest amount of electric energy is transmitted accordingly. Therefore, the electric energy transmission efficiency is greatly improved by only adjusting the direction to point exactly to an electricity transmission receiving device. When there are multiple electricity transmission receiving devices, for example, when all electricity transmission devices are located in a same quadrant, power can be supplied to the multiple receiving devices only by changing, in real time, a ratio between or values of amplitudes of currents flowing through subcoils, so that a magnetic field direction is continuously scanned in the quadrant. For another example, when multiple electricity transmission receiving devices are distributed in different quadrants, it is required to not only change, in real time, a ratio between or values of amplitudes of currents flowing through subcoils but also change a phase difference between the currents to implement control over a magnetic field direction at any angle. Further, within a three-dimensional space range formed by an X-axis, a Y-axis, and a Z-axis, it may be considered that a magnetic field direction is firstly controlled within a planar angle range of the X-axis and the Y-axis and then a final magnetic field direction is controlled by further using the Z-axis, that is, the magnetic field direction is controlled within two planar angle ranges in two steps.

Method 2

Figure 13A:
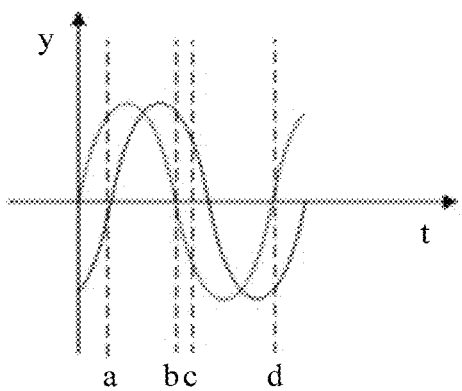
FIG. 13A is a first schematic phase diagram of Method 2 for adjusting a magnetic field direction by an electricity transmission sending device according to the present invention.
Figure 13B:
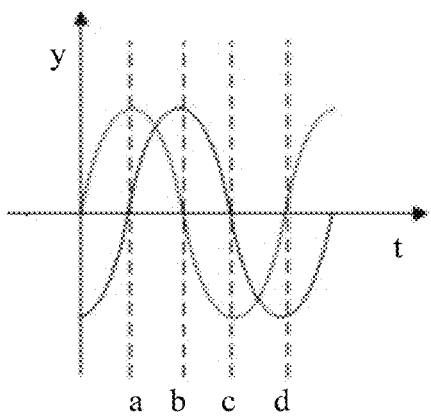
FIG. 13B is a second schematic phase diagram of Method 2 for adjusting a magnetic field direction by the electricity transmission sending device according to the present invention.
Figure 13C:
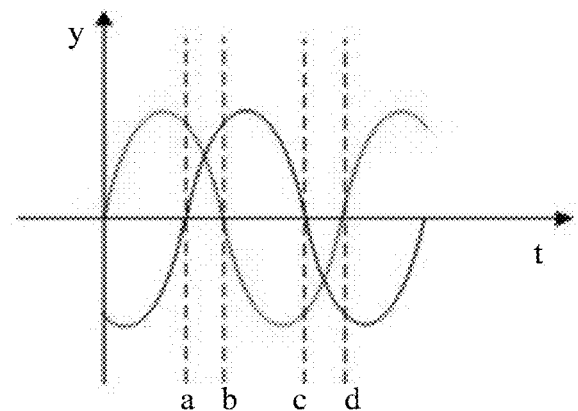
FIG. 13C is a third schematic phase diagram of Method 2 for adjusting a magnetic field direction by the electricity transmission sending device according to the present invention.
Figure 13D:
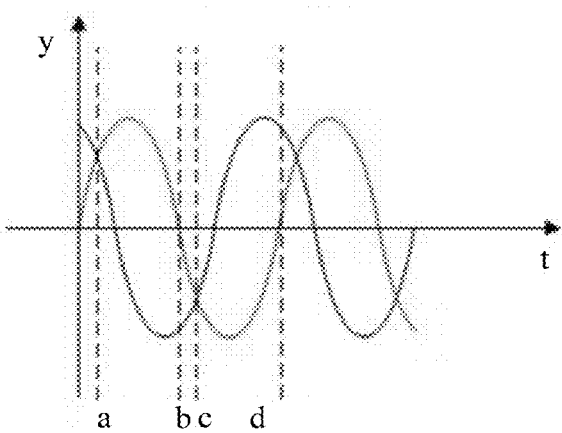
FIG. 13D is a fourth schematic phase diagram of Method 2 for adjusting a magnetic field direction by the electricity transmission sending device according to the present invention.
Figure 13E:
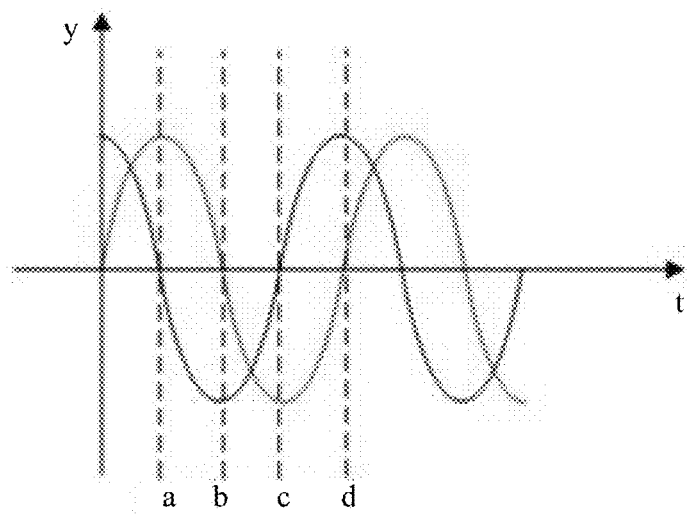
FIG. 13E is a fifth schematic phase diagram of Method 2 for adjusting a magnetic field direction by the electricity transmission sending device according to the present invention.
Figure 13F:
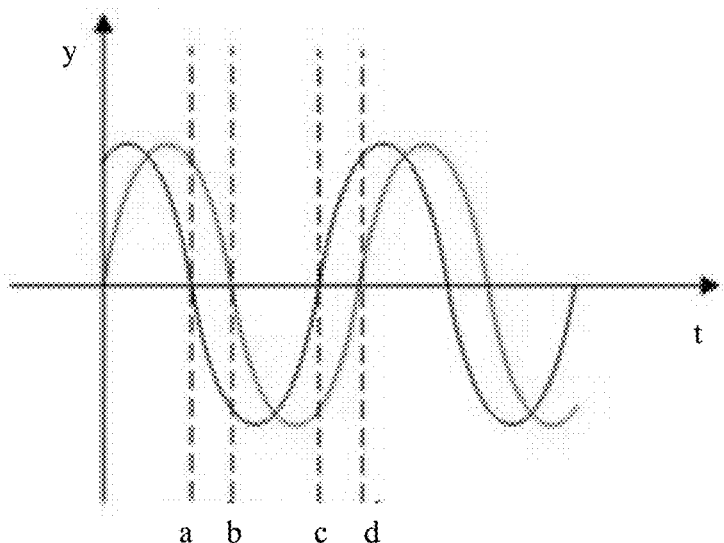
FIG. 13F is a sixth schematic phase diagram of Method 2 for adjusting a magnetic field direction by the electricity transmission sending device according to the present invention.

FIG. 13A is a first schematic phase diagram of Method 2 for adjusting the magnetic field direction by the electricity transmission sending device according to the present invention. FIG. 13B is a second schematic phase diagram of Method 2 for adjusting the magnetic field direction by the electricity transmission sending device according to the present invention. FIG. 13C is a third schematic phase diagram of Method 2 for adjusting the magnetic field direction by the electricity transmission sending device according to the present invention. FIG. 13D is a fourth schematic phase diagram of Method 2 for adjusting the magnetic field direction by the electricity transmission sending device according to the present invention. FIG. 13E is a fifth schematic phase diagram of Method 2 for adjusting the magnetic field direction by the electricity transmission sending device according to the present invention. FIG. 13F is a sixth schematic phase diagram of Method 2 for adjusting the magnetic field direction by the electricity transmission sending device according to the present invention. With reference to FIG. 13A to FIG. 13F, within a cycle, phases and amplitudes of two currents continuously vary as time changes. When there is a phase difference between currents flowing through two mutually perpendicular subcoils, a magnetic field direction keeps changing accordingly. When the phase difference between the currents is less than 90°, time lengths of a to b and c to d are large, that is, the currents are in a same phase for a long time, and therefore, the magnetic field direction is mainly centralized in the first and third quadrants and there is a maximum value. When the phase difference between the currents is equal to 90° or 270°, time lengths of a to b, b to c, and c to d are the same, that is, a time in which the currents are in a same phase is equal to a time in which the currents are in opposite phases, and therefore, time lengths of the magnetic field direction in four quadrants are equal and maximum values are equal.

When the phase difference between the currents is greater than 90° and less than 270°, a time in which the currents are in opposite phases is long, and therefore, the magnetic field direction is mainly centralized in the second and fourth quadrants and there is a maximum value. FIG. 13A to FIG. 13F are schematic diagrams of Method 2 for adjusting the magnetic field direction by the electricity transmission sending device. A magnetic field direction can be controlled to be in an expected quadrant for a longer time by controlling a phase difference between currents flowing through two mutually perpendicular subcoils to be within any planar angle range except 0° or 180°, and therefore an electricity transmission receiving device can receive higher power as long as the electricity transmission receiving device is located in the quadrant. When there are multiple electricity transmission receiving devices, for example, when all electricity transmission receiving devices are located in the first quadrant, the phase difference between the currents flowing through the two mutually perpendicular subcoils can be controlled to be between 0° and 90°. In this case, change in phases of currents is shown in FIG. 13A, where the magnetic field direction is located in the first and third quadrants for most of the time, an electric energy transmission requirement can be met. If electricity transmission receiving devices are distributed in four quadrants, it is only necessary to control the phase difference between the currents flowing through the two mutually perpendicular subcoils to be 90° or 270°. In this case, change in phases of currents is shown in FIG. 13B or FIG. 13E, where time lengths of the magnetic field direction in the four quadrants are equal, that is, electric energy can be evenly transmitted to the electricity transmission receiving devices in the quadrants. Further, within a three-dimensional space range formed by an X-axis, a Y-axis, and a Z-axis, it may be considered that a magnetic field direction is first controlled within a planar angle range of the X-axis and the Y-axis and then a final magnetic field direction is controlled by using the Z-axis, that is, the magnetic field direction is controlled within two planar angle ranges in two steps.

Figure 13G:
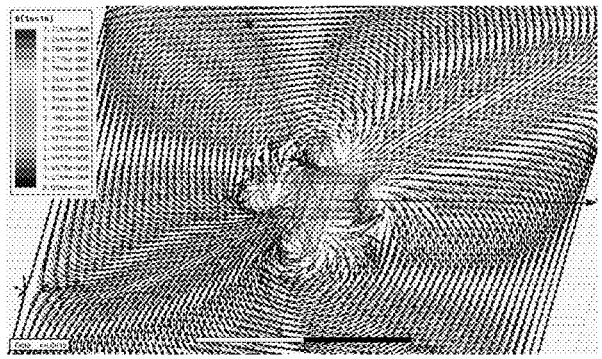
FIG. 13G is a first magnetic field emulation diagram for Method 2 for adjusting a magnetic field direction by the electricity transmission sending device according to the present invention.
Figure 13H:
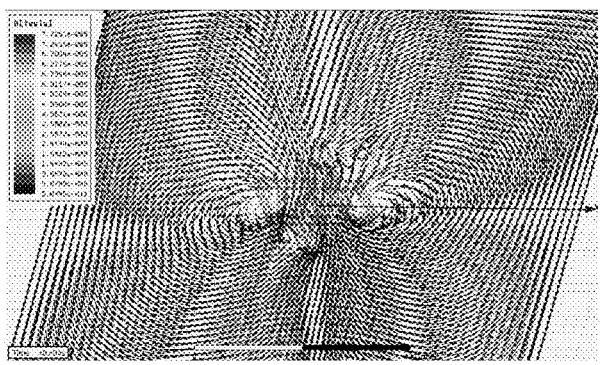
FIG. 13H is a second magnetic field emulation diagram for Method 2 for adjusting a magnetic field direction by the electricity transmission sending device according to the present invention.
Figure 13I:
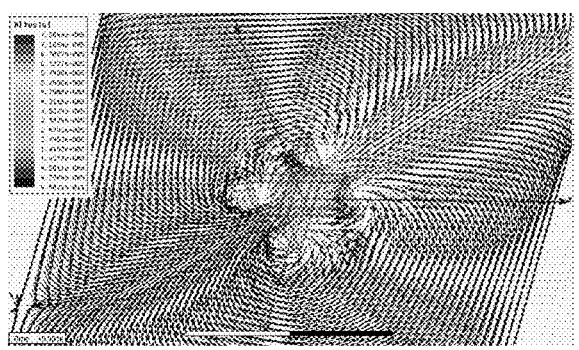
FIG. 13I is a third magnetic field emulation diagram for Method 2 for adjusting a magnetic field direction by the electricity transmission sending device according to the present invention.
Figure 13J:
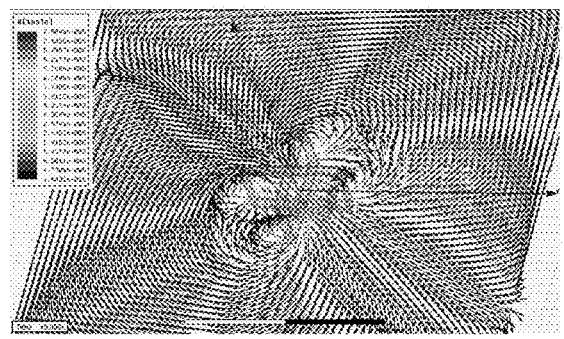
FIG. 13J is a fourth magnetic field emulation diagram for Method 2 for adjusting a magnetic field direction by the electricity transmission sending device according to the present invention.

Emulation software may be used to obtain magnetic field distribution in a case of different amplitude ratios between currents. The following uses several examples to specifically indicate distribution of a synthesized magnetic field. FIG. 13G is a first diagram of magnetic field emulation for Method 2 for adjusting the magnetic field direction by the electricity transmission sending device according to the present invention. FIG. 13H is a second diagram of magnetic field emulation for Method 2 for adjusting the magnetic field direction by the electricity transmission sending device according to the present invention. FIG. 13I is a third diagram of magnetic field emulation for Method 2 for adjusting the magnetic field direction by the electricity transmission sending device according to the present invention. FIG. 13J is a fourth diagram of magnetic field emulation for Method 2 for adjusting the magnetic field direction by the electricity transmission sending device according to the present invention. As shown in FIG. 13G, a phase difference between the current Ix and the current Iy is 45°, and time is 0.001 seconds. As shown in FIG. 13H, a phase difference between the current Ix and the current Iy is 45°, and time is 0.004 seconds. As shown in FIG. 13I, a phase difference between the current Ix and the current Iy is 90°, and time is 0.001 seconds. As shown in FIG. 13J, a phase difference between the current Ix and the current Iy is 90°, and time is 0.009 seconds.

It can be learned that the electricity transmission sending device 10 can control a magnetic field direction to fall within a range of a planar angle of 360° and even in any direction of a three-dimensional azimuth by adjusting the amplitude ratio and the phase difference between currents of mutually perpendicular subcoils. Further, as long as the magnetic field direction is adjusted to an optimal magnetic field direction, the electricity transmission receiving device can obtain maximum electric energy received power in this direction, thereby improving the electric energy transmission efficiency.

Figure 14A:
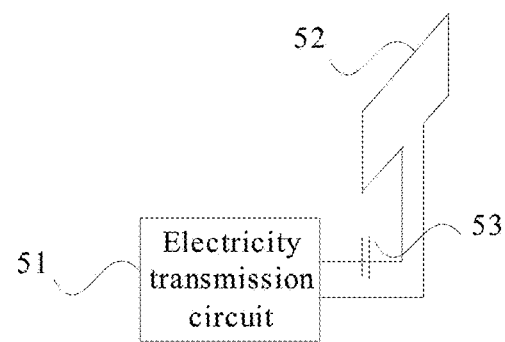
FIG. 14A is a first schematic structural diagram of a subcoil in Embodiment 1 of the electricity transmission sending device according to the present invention.
Figure 14B:
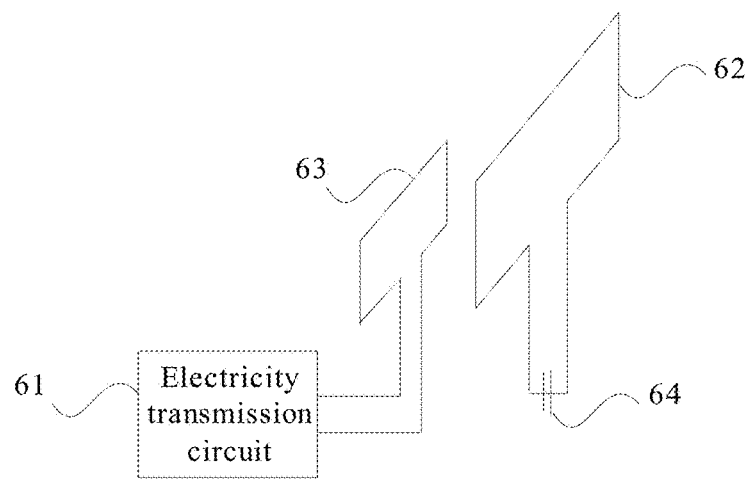
FIG. 14B is a second schematic structural diagram of a subcoil in Embodiment 1 of the electricity transmission sending device according to the present invention.

Further, FIG. 14A is a first schematic structural diagram of a subcoil in Embodiment 1 of the electricity transmission sending device according to the present invention. FIG. 14B is a second schematic structural diagram of a subcoil in Embodiment 1 of the electricity transmission sending device according to the present invention. FIG. 14A and FIG. 14B respectively show two schematic structural diagrams of each subcoil of the at least two mutually perpendicular subcoils. As shown in FIG. 14A, the subcoil is a transmit subcoil 52 that is connected to a transmission circuit 51, and a capacitor 53 is disposed on a connection line. The transmit subcoil 52 is a multi-turn coil and current intensity is in direct proportion to the number of turns of the coil. A more intense current leads to generation of a stronger magnetic field. The capacitor 53 works with the transmit subcoil 52 to lead to magnetic field resonance. As shown in FIG. 14B, the subcoil may include two parts: an excitation subcoil 63 and a transmit subcoil 62. The excitation subcoil 63 is connected to a transmission circuit 61 and the transmit subcoil 62 corresponds to the excitation subcoil 63. A capacitor 64 is included in the transmit subcoil 62. Electric energy is transferred between the transmit subcoil 62 and the excitation subcoil 63 by means of electromagnetic induction. The transmit subcoil 62 is a multi-turn coil and the current intensity is in direct proportion to the number of turns of the coil. A more intense current leads to generation of a stronger magnetic field. The coil structure shown in FIG. 14B is to protect a transmission circuit against an impact of an intense current. In addition, mutually perpendicular subcoils may be coils in any form and the number of coil turns may also be any number, which is not specifically limited herein.

Figure 15:
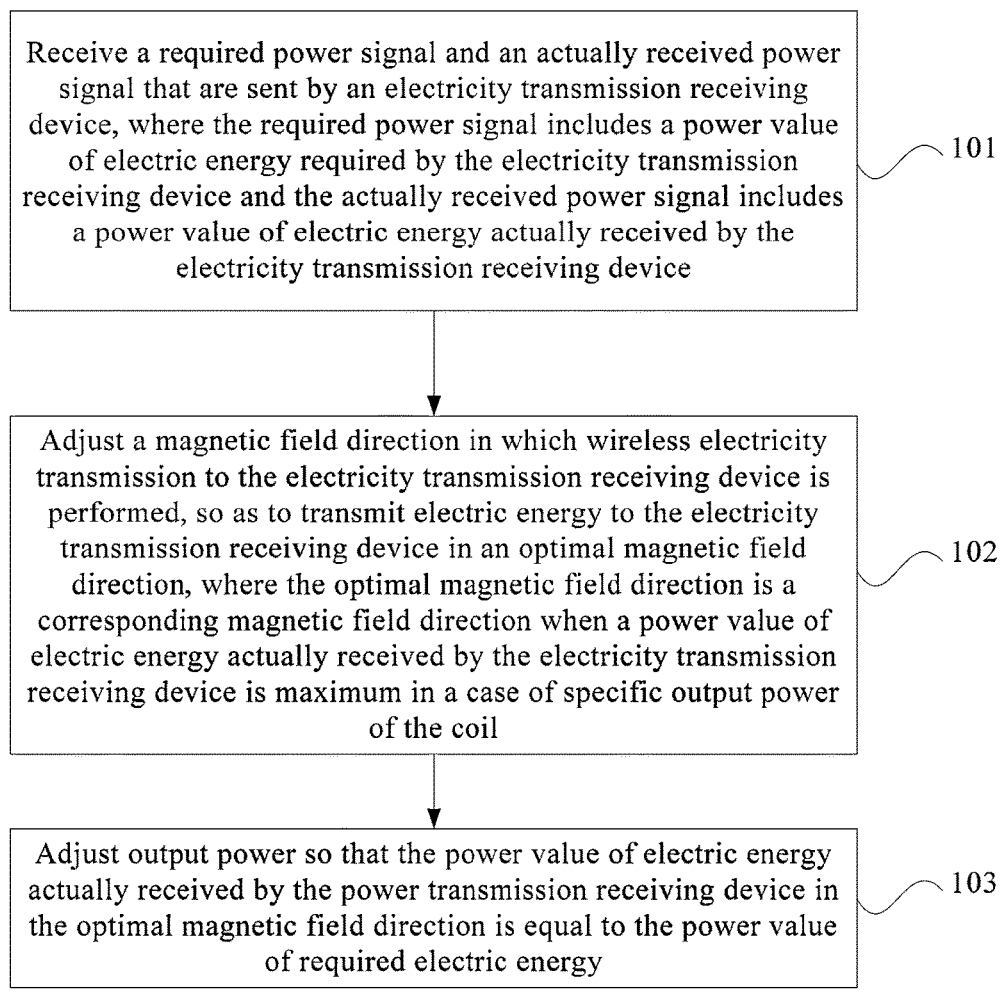
FIG. 15 is a flowchart of Embodiment 1 of an electricity transmission sending method according to the present invention.

FIG. 15 is a flowchart of Embodiment 1 of an electricity transmission sending method according to the present invention. As shown in FIG. 15, the method provided by this embodiment may include:

Step 101: Receive a required power signal and an actually received power signal that are sent by an electricity transmission receiving device, where the required power signal includes a power value of electric energy required by the electricity transmission receiving device and the actually received power signal includes a power value of electric energy actually received by the electricity transmission receiving device.

This embodiment is executed by an electricity transmission sending device. A communications unit of the electricity transmission sending device communicates with a communications unit of the electricity transmission receiving device to receive the required power signal and the actually received power signal that are sent by the electricity transmission receiving device. The required power signal is the power value of the electric energy required by the electricity transmission receiving device and the actually received power signal is the power value of the electric energy actually received by the electricity transmission receiving device. Based on the foregoing two power values, the electricity transmission sending device can learn a requirement of the electricity transmission receiving device and an electric energy transmission status in real time.

Step 102: Adjust a magnetic field direction in which wireless electricity transmission to the electricity transmission receiving device is performed, so as to transmit electric energy to the electricity transmission receiving device in an optimal magnetic field direction, where the optimal magnetic field direction is a corresponding magnetic field direction when a power value of electric energy actually received by the electricity transmission receiving device is maximum in a case of specific output power of the coil.

In this embodiment, the electricity transmission sending device adjusts the magnetic field direction in which wireless electricity transmission to the electricity transmission receiving device is performed, with a purpose of transmitting electric energy to the electricity transmission receiving device in the optimal magnetic field direction. When the electricity transmission sending device transmits electric energy to the electricity transmission receiving device in the optimal magnetic field direction, power of the electric energy received by the electricity transmission receiving device is maximum, which is exactly an expected effect in wireless electricity transmission.

Step 103: Adjust output power so that the power value of electric energy actually received by the electricity transmission receiving device in the optimal magnetic field direction is equal to the power value of required electric energy.

In this embodiment, after adjusting the magnetic field direction, the electricity transmission sending device can transmit electric energy to the electricity transmission receiving device in this direction according to a magnetic field resonance principle. The electricity transmission sending device can adjust output power according to the power value of the electric energy required by the electricity transmission receiving device in the required power signal, so that the power value of the electric energy actually received by the electricity transmission receiving device in the optimal magnetic field direction is equal to the power value of the required electric energy.

In this embodiment, the magnetic field direction in which wireless electricity transmission to the electricity transmission receiving device is performed is adjusted according to the required power signal and the actually received power signal of the electricity transmission receiving device, so as to adjust the magnetic field direction to the optimal magnetic field direction, that is, the power value of the electric energy actually received by the electricity transmission receiving device is maximum when the electricity transmission sending device performs wireless electricity transmission to the electricity transmission receiving device in the optimal magnetic field direction, which solves an inefficient electric energy transmission problem. In addition, an electric energy requirement of the electricity transmission receiving device is met by adjusting the output power.

Figure 16:
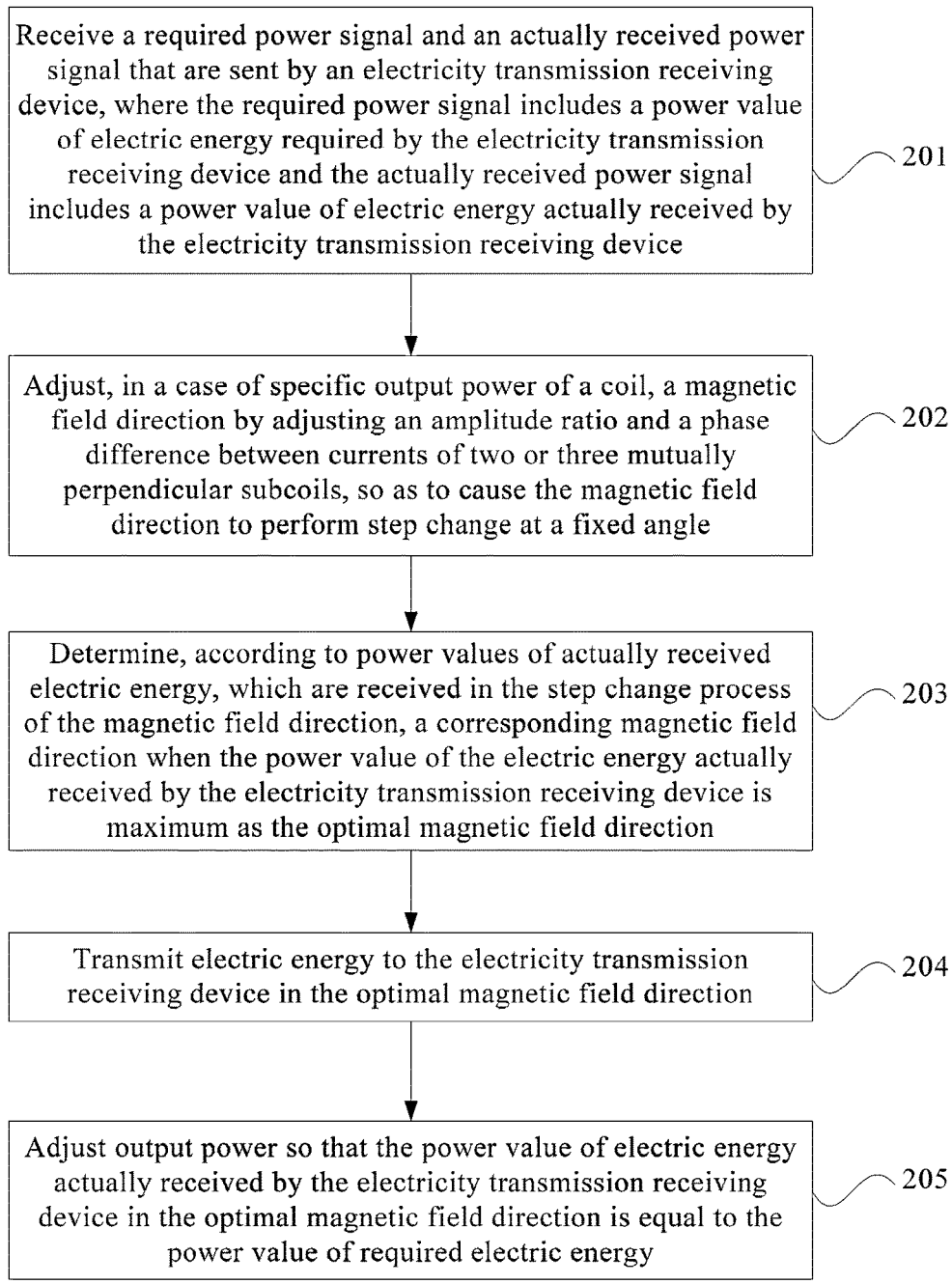
FIG. 16 is a flowchart of Embodiment 2 of an electricity transmission sending method according to the present invention.

FIG. 16 is a flowchart of Embodiment 2 of an electricity transmission sending method according to the present invention. As shown in FIG. 16, the method provided by this embodiment may include:

Step 201: Receive a required power signal and an actually received power signal that are sent by an electricity transmission receiving device, where the required power signal includes a power value of electric energy required by the electricity transmission receiving device and the actually received power signal includes a power value of electric energy actually received by the electricity transmission receiving device.

In this embodiment, a process of receiving the required power signal and the actually received power signal that are sent by the electricity transmission receiving device is similar to step 101 in the foregoing method embodiment, and details are not described herein again.

Step 202: Adjust, in a case of specific output power of a coil, a magnetic field direction by adjusting an amplitude ratio and a phase difference between currents of two or three mutually perpendicular subcoils, so as to cause the magnetic field direction to perform step change at a fixed angle.

In this embodiment, the electricity transmission sending device determines one power value as the output power. The power value may be the power value of the electric energy required by the electricity transmission receiving device, or may be another power value, which is not specifically limited herein. In a case of specific output power, the electricity transmission sending device adjusts the magnetic field direction by adjusting the amplitude ratio and phase difference between currents of the two or three mutually perpendicular subcoils. A specific implementation method is shown in FIG. 11A to FIG. 14J, and details are not described herein again. According to the foregoing description, the electricity transmission sending device can precisely perform step change on the magnetic field direction at a fixed angle.

Step 203: Determine, according to power values of actually received electric energy, which are received in the step change process of the magnetic field direction, a corresponding magnetic field direction when the power value of the electric energy actually received by the electricity transmission receiving device is maximum as an optimal magnetic field direction.

In this embodiment, while performing step change on the magnetic field direction, the electricity transmission sending device receives the power value of the actually received electric energy that is sent by the electricity transmission receiving device, and acquires a maximum power value of the electric energy actually received by the electricity transmission receiving device in the step change process by means of iterative comparison. A magnetic field direction corresponding to the maximum power value is the optimal magnetic field direction.

Step 204: Transmit electric energy to the electricity transmission receiving device in the optimal magnetic field direction.

In this embodiment, the electricity transmission sending device performs wireless electricity transmission to the electricity transmission receiving device in the optimal magnetic field direction; and in this case, power of the electric energy actually received by the electricity transmission receiving device is maximum and least electric energy is lost in a transmission path, which is exactly an expected effect in wireless electricity transmission.

Step 205: Adjust output power so that the power value of electric energy actually received by the electricity transmission receiving device in the optimal magnetic field direction is equal to the power value of required electric energy.

In this embodiment, a process of adjusting output power so that the power value of the electric energy actually received by the electricity transmission receiving device in the optimal magnetic field direction is equal to the power value of required electric energy is similar to step 103 in the foregoing method embodiment, and details are not described herein again.

In this embodiment, the magnetic field direction in which wireless electricity transmission to the electricity transmission receiving device is performed is adjusted according to the required power signal and the actually received power signal of the electricity transmission receiving device, so as to adjust the magnetic field direction to the optimal magnetic field direction by using an iterative comparison method, that is, the power value of the electric energy actually received by the electricity transmission receiving device is maximum when the electricity transmission sending device performs wireless electricity transmission to the electricity transmission receiving device in the optimal magnetic field direction, which solves an inefficient electric energy transmission problem. In addition, an electric energy requirement of the electricity transmission receiving device is met by adjusting the output power.

Further, based on the method process shown in FIG. 16, a specific implementation method for the adjusting, in a case of specific output power of the coil, the magnetic field direction by adjusting the amplitude ratio and the phase difference between currents of two or three mutually perpendicular subcoils, so as to cause the magnetic field direction to perform step change at a fixed angle in step 202 may include: adjusting a range of a two-dimensional quadrant or a three-dimensional quadrant in which the magnetic field direction is located by adjusting the phase difference; and adjusting a deflection angle of the magnetic field direction within the range by adjusting the amplitude ratio between the currents, so as to cause the magnetic field direction to perform step change at the fixed angle.

In this embodiment, the electricity transmission sending device adjusts the magnetic field direction by adjusting the amplitude ratio and the phase difference between the currents of the two or three mutually perpendicular subcoils. The phase difference between the currents may determine the range of the magnetic field direction in the two-dimensional quadrant or the three-dimensional quadrant, for example, in the two-dimensional quadrant, a phase difference of 0° indicates a same phase and that a magnetic field direction is located in the first and third quadrants; and a phase difference of 180° indicates opposite phases and that a magnetic field direction is located in the second and fourth quadrants. The amplitude ratio between the currents can determine a deflection angle of the magnetic field direction in a quadrant in which the magnetic field direction is located, for example, when an amplitude ratio between the currents is 1:2, it indicates that a deflection angle of a magnetic field direction is 30°. Therefore, the magnetic field direction can be precisely adjusted. A detailed implementation principle and method are shown in FIG. 9A to FIG. 12J, and details are not described herein again.

Figure 17:
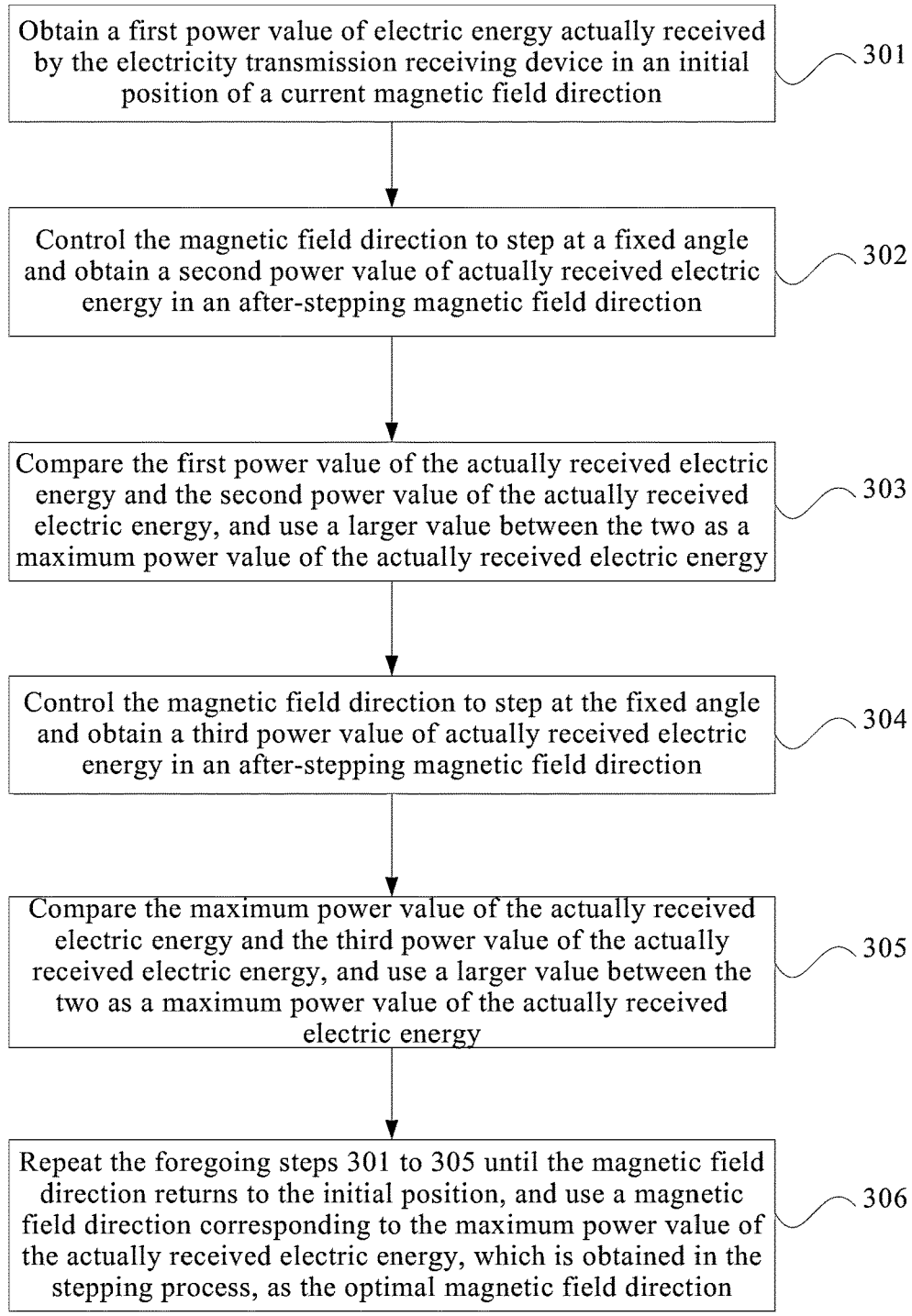
FIG. 17 is a flowchart of Embodiment 3 of an electricity transmission sending method according to the present invention.

Further, FIG. 17 is a flowchart of Embodiment 3 of an electricity transmission sending method according to the present invention. As shown in FIG. 17, a specific implementation method for the determining, according to power values of actually received electric energy, which are received in the step change process of the magnetic field direction, a corresponding magnetic field direction when the power value of the electric energy actually received by the electricity transmission receiving device is maximum as the optimal magnetic field direction in step 203 in the method process shown in FIG. 16 may include:

Step 301: Obtain a first power value of electric energy actually received by the electricity transmission receiving device in an initial position of a current magnetic field direction.

In this embodiment, the electricity transmission sending device can adjust an initial position of the magnetic field direction to any direction because the electricity transmission sending device does not learn the position of the electricity transmission receiving device at an initial stage. Therefore, at this stage, any direction may be used as the initial magnetic field direction for performing wireless electricity transmission; and in this case, the actually received power signal that is received by the electricity transmission sending device and sent by the electricity transmission receiving device includes the first power value of the actually received electric energy.

Step 302: Control the magnetic field direction to step at a fixed angle and obtain a second power value of actually received electric energy in an after-stepping magnetic field direction.

In this embodiment, the electricity transmission sending device adjusts the magnetic field direction to step at the fixed angle and obtains the second power value of the actually received electric energy, where the second power value is included in the actually received power signal that is sent by the electricity transmission receiving device in the after-stepping magnetic field direction.

Step 303: Compare the first power value of the actually received electric energy and the second power value of the actually received electric energy, and use a larger value between the two as a maximum power value of the actually received electric energy.

Step 304: Control the magnetic field direction to step at the fixed angle and obtain a third power value of actually received electric energy in an after-stepping magnetic field direction.

In this embodiment, the electricity transmission sending device adjusts the magnetic field direction to step further at the fixed angle and obtains the third power value of the actually received electric energy, where the third power value is included in the actually received power signal that is sent by the electricity transmission receiving device in the after-further-stepping magnetic field direction.

Step 305: Compare the maximum power value of the actually received electric energy and the third power value of the actually received electric energy, and use a larger value between the two as a maximum power value of the actually received electric energy.

In this embodiment, a larger value in the power values of the electric energy actually received by the electricity transmission receiving device in the first two steppings is compared with the third power value of the actually received electric energy, to acquire a maximum value of the actually received energy among the three.

Step 306: Repeat the foregoing steps 301 to 305 until the magnetic field direction returns to the initial position, and use a magnetic field direction corresponding to the maximum power value of the actually received electric energy, which is obtained in the stepping process, as the optimal magnetic field direction.

In this embodiment, the maximum power value of the actually received electric energy is acquired by iteratively comparing the power values of the electric energy actually received by the electricity transmission receiving device in the stepping process, and the magnetic field direction corresponding to the maximum power value is used as the optimal magnetic field direction, so that the power value of the electric energy actually received by the electricity transmission receiving device is maximum when the electricity transmission sending device performs wireless electricity transmission to the electricity transmission receiving device in the optimal magnetic field direction, which solves an inefficient electric energy transmission problem. In addition, an electric energy requirement of the electricity transmission receiving device is met by adjusting the output power.

Figure 18:
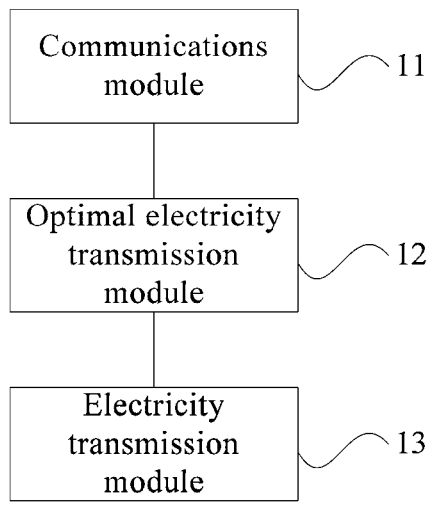
FIG. 18 is a schematic structural diagram of Embodiment 1 of an electricity transmission sending apparatus according to the present invention.

FIG. 18 is a schematic structural diagram of Embodiment 1 of an electricity transmission sending apparatus according to the present invention. As shown in FIG. 18, the apparatus provided by this embodiment may include: a communications module 11, an optimal electricity transmission module 12, and an electric energy transmission module 13. The communications module 11 is configured to receive a required power signal and an actually received power signal that are sent by an electricity transmission receiving device, where the required power signal includes a power value of electric energy required by the electricity transmission receiving device and the actually received power signal includes a power value of electric energy actually received by the electricity transmission receiving device. The optimal electricity transmission module 12 is configured to adjust a magnetic field direction in which wireless electricity transmission to the electricity transmission receiving device is performed, so as to transmit electric energy to the electricity transmission receiving device in an optimal magnetic field direction, where the optimal magnetic field direction is a corresponding magnetic field direction when a power value of electric energy actually received by the electricity transmission receiving device is maximum in a case of specific output power of the coil. The electric energy transmission module 13 is configured to adjust output power of the coil so that the power value of electric energy actually received by the electricity transmission receiving device in the optimal magnetic field direction is equal to the power value of required electric energy.

The apparatus provided by this embodiment can be configured to execute the technical solution of the method embodiment shown in FIG. 15. Its implementation principle and technical effect are similar, and details are not described herein again.

Figure 19:
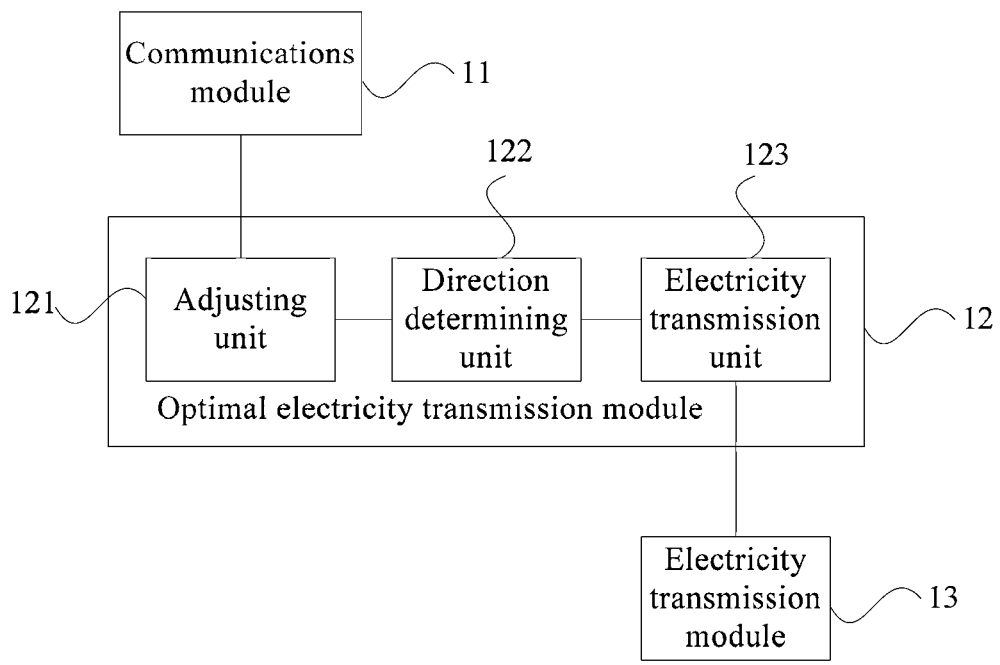
FIG. 19 is a schematic structural diagram of Embodiment 2 of an electricity transmission sending apparatus according to the present invention.

FIG. 19 is a schematic structural diagram of Embodiment 2 of an electricity transmission sending apparatus according to the present invention. As shown in FIG. 19, the apparatus provided by this embodiment is based on the apparatus structure shown in FIG. 18. Further, the optimal electricity transmission module 12 may include: an adjusting unit 121, a direction determining unit 122, and an electricity transmission unit 123. The adjusting unit 121 is configured to adjust, in a case of specific output power of the coil, the magnetic field direction by adjusting an amplitude ratio and a phase difference between currents of the two or three mutually perpendicular subcoils, so as to cause the magnetic field direction to perform step change at a fixed angle. The direction determining unit 122 is configured to determine, according to power values of actually received electric energy, which are received in the step change process of the magnetic field direction, a corresponding magnetic field direction when the power value of the electric energy actually received by the electricity transmission receiving device is maximum as the optimal magnetic field direction. The electricity transmission unit 123 is configured to transmit electric energy to the electricity transmission receiving device in the optimal magnetic field direction and adjust output power of the coil, so that the power value of electric energy actually received by the electricity transmission receiving device is equal to the power value of required electric energy.

Further, the adjusting unit 121 may further be specifically configured to: adjust a range of a two-dimensional quadrant or a three-dimensional quadrant in which the magnetic field direction is located by adjusting the phase difference; and adjust a deflection angle of the magnetic field direction within the range by adjusting the amplitude ratio between the currents, so as to cause the magnetic field direction to perform step change at the fixed angle.

The apparatus provided by this embodiment can be configured to execute the technical solution of the method embodiment shown in FIG. 15 or FIG. 16. Its implementation principle and technical effect are similar, and details are not described herein again.

Figure 20:
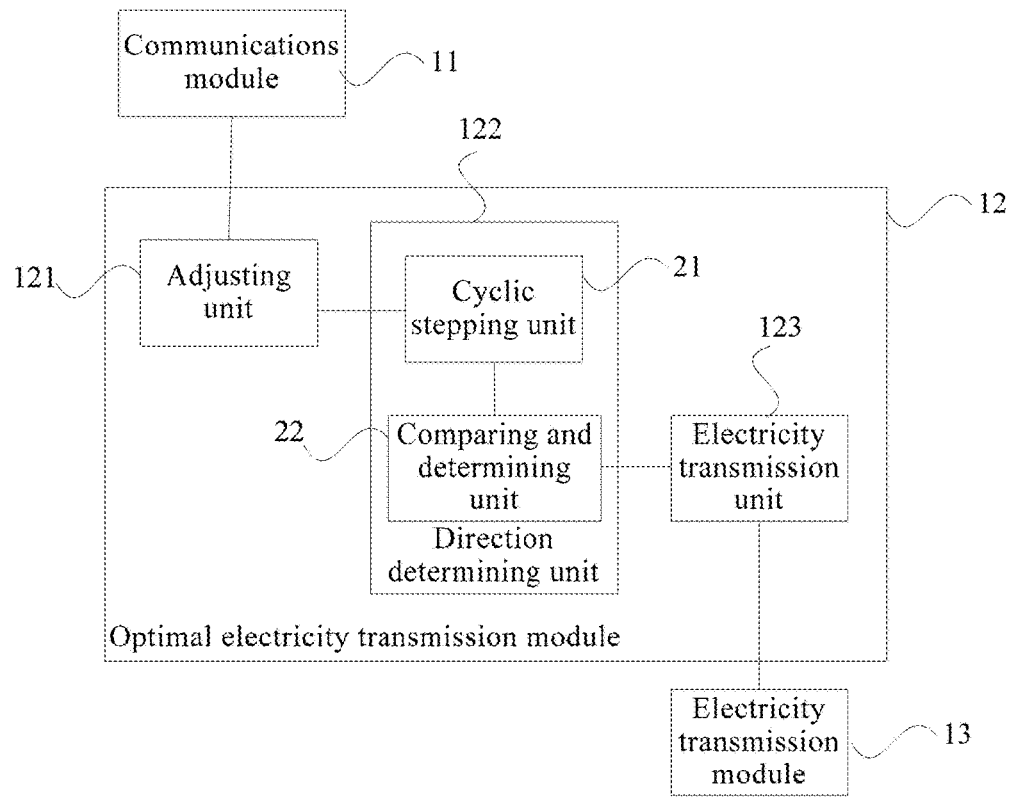
FIG. 20 is a schematic structural diagram of Embodiment 3 of an electricity transmission sending apparatus according to the present invention.

FIG. 20 is a schematic structural diagram of Embodiment 3 of an electricity transmission sending apparatus according to the present invention. As shown in FIG. 20, the apparatus provided by this embodiment is based on the apparatus structure shown in FIG. 19. Further, the direction determining unit 122 may include: a cyclic stepping unit 21 and a comparing and determining unit 22. The cyclic stepping unit 21 is configured to control the magnetic field direction to step towards a same direction at the fixed angle until the magnetic field direction returns to an initial position. The comparing and determining unit 22 is configured to obtain a power value of electric energy actually received by the electricity transmission receiving device before the stepping and obtain a power value of actually received electric energy, which is obtained after each stepping; compare all the obtained power values of the actually received electric energy; and determine a magnetic field direction corresponding to a maximum power value of the actually received electric energy as the optimal magnetic field direction.

The apparatus provided by this embodiment can be configured to execute the technical solution of the method embodiment shown in any one of FIG. 15 to FIG. 17. Its implementation principle and technical effect are similar, and details are not described herein again.

Figure 21:
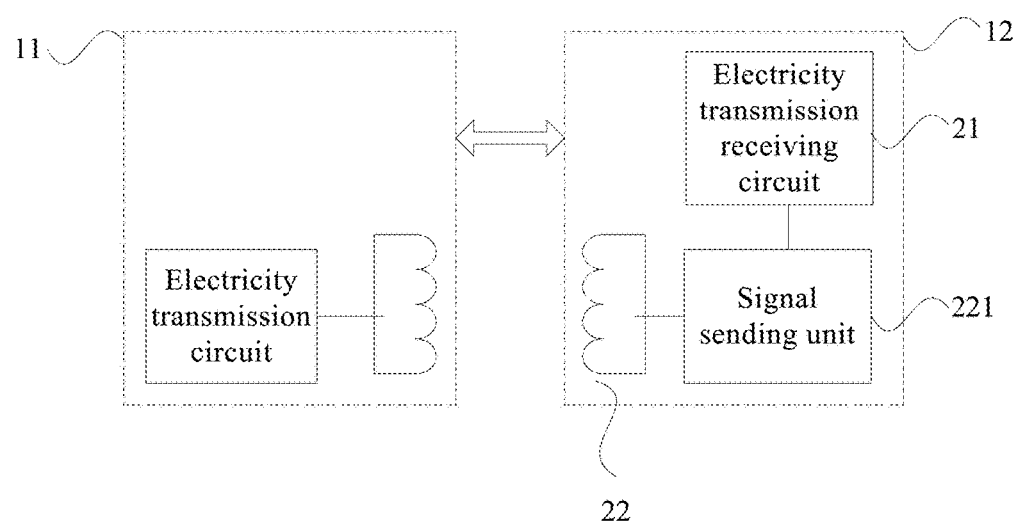
FIG. 21 is a schematic structural diagram of an electric energy transmission system according to an embodiment of the present invention.

FIG. 21 is a schematic structural diagram of an electric energy transmission system according to an embodiment of the present invention. As shown in FIG. 21, the system provided by this embodiment may include: an electricity transmission sending device 11 and an electricity transmission receiving device 12. The electricity transmission sending device 11 may use the structure of any electricity transmission sending device embodiment shown in the foregoing FIG. 1 to FIG. 9, FIG. 14A, and FIG. 14B. The electricity transmission sending device 11 performs wireless electricity transmission to the electricity transmission receiving device 12. The electricity transmission receiving device 12 may include an electricity transmission receiving circuit 21 that is configured to receive wireless electricity transmission and a receiving coil 22. The receiving coil 22 includes a signal sending unit 221, where the signal sending unit 221 is configured to send a required power signal and an actually received power signal to the electricity transmission sending device 11. The electricity transmission receiving circuit 21 is configured to receive electric energy that the electricity transmission sending device 11 transmits by means of wireless electricity transmission.

In this embodiment, the electricity transmission sending device performs wireless electricity transmission to the electricity transmission receiving device, which implements "obtaining electricity across space", minimizes an electric energy loss in a transmission path, and improves the electric energy transmission efficiency.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An energy transmitter for wirelessly transmitting electrical energy to an energy receiving device, the energy transmitter comprising:
   a coil comprising at least two mutually perpendicular subcoils, wherein the coil is configured to generate a magnetic field for transmitting electrical energy to the energy receiving device;
   a signal sending unit configured to receive a required power signal and an actually received power signal from the energy receiving device, wherein the required power signal includes information of an amount of power required by the energy receiving device and the actually received power signal includes information of power actually received by the energy receiving device;
   a controlling unit configured to (a) adjust an amplitude ratio and a phase difference between currents of the at least two mutually perpendicular subcoils in step-like changes towards a same direction at a fixed angle until a direction of the magnetic field returns to an initial position before the stepping;
   a sampling and comparing unit configured to (a) obtain and compare the actually received power signals before and after each stepping, and (b) determine the direction of the magnetic field corresponding to a maximum power value of the actually received power signals as an optimal direction of the magnetic field; and
   a power transmission unit configured to (a) control the coil to transmit the electrical energy to the energy receiving device in the optimal direction of the magnetic field and (b) adjust an output power so that the power received by the energy receiving device is equal to power represented by the required power signal.

2. The energy transmitter according to claim 1, wherein the step controlling unit comprises a delayer, a direct current voltage-adjustable power source, and a high frequency inverter, wherein:
   the high frequency inverter is configured to convert a direct current output by the direct current voltage-adjustable power source into an alternating current and then output the alternating current to the at least two mutually perpendicular subcoils;
   the delayer is configured to delay a frequency driving signal, wherein the delayed frequency driving signal is used to generate the phase difference between the currents of the at least two mutually perpendicular subcoils, wherein the phase difference is used to determine a range of a two-dimensional quadrant or a three-dimensional quadrant in which a direction of the magnetic field generated by the coil is located; and
   the direct current voltage-adjustable power source is configured to output a direct current and adjust the amplitude ratio between the currents output to the at least two mutually perpendicular subcoils, so as to adjust the direction of the magnetic field generated by the coil to perform the step change within the range.

3. An electric energy transmission system comprising an energy transmitter and an energy receiving device according to claim 1 and the energy receiving device further comprises:
   an energy receiving circuit configured to receive the wireless electrical energy transmission; and
   a receiving coil comprising a signal sending unit configured to send the required power signal and the actually received power signal to the energy transmitter.

4. An electricity transmission sending method comprising:
   receiving, by an energy transmitter, a required power signal and an actually received power signal that are from an energy receiving device, wherein the required power signal includes information of an amount of required power value of electrical energy required by the energy receiving device and the actually received power signal includes information of actually received power value;
   adjusting, by the energy transmitter, an amplitude ratio and a phase difference between currents of the at least two mutually perpendicular subcoils so as to cause a direction of an associated magnetic field to perform step change at a fixed angle;
   determining, an optimum direction of the associated magnetic field by:
      a) controlling the direction of the associated magnetic field to step at the fixed angle until the direction returns to a starting direction while obtaining actually received power signals at each step;
      b) selecting a largest value of the actually received power signals as a maximum power value; and
      c) identifying a direction of the associated magnetic field providing the maximum power value as the optimal direction;
   controlling, by the energy transmitter, the two subcoils to transmit electrical energy to the energy receiving device in the optimal magnetic field direction; and
   adjusting, by the energy transmitter, output power of the coil, so that the power received by the energy receiving device is substantially equal to the power required by the energy receiving device.

5. The method according to claim 4, wherein adjusting the magnetic field direction comprises:
   adjusting a range of a two-dimensional quadrant or a three-dimensional quadrant in which the magnetic field direction is located by adjusting the phase difference; and
   adjusting a deflection angle of the magnetic field direction within the range by adjusting the amplitude ratio between the currents, so as to cause the magnetic field direction to perform step change at the fixed angle.

6. An energy transmitter comprising:
   a communications module configured to receive a required power signal and an actually received power signal from an energy receiving device, wherein the required power signal includes information of an amount of required power value required by the energy receiving device and the received power signal that includes information of a received power value actually received by the energy receiving device;
   an optimal electricity transmission module configured to adjust an amplitude ratio and a phase difference between currents of the at least two mutually perpendicular subcoils so as to cause a direction of an associated magnetic field to perform step change at a fixed angle in order to determine an optimum direction of the associated magnetic field by:
  a) controlling the direction of the associated magnetic field to step at the fixed angle until the direction returns to a starting direction while obtaining actually received power signals at each step;
  b) selecting a largest value of the actually received power signals as a maximum power value; and
  c) identifying a direction of the associated magnetic field providing the maximum power value as the optimal direction; and
an electric energy transmission module configured to control the two subcoils to transmit electrical energy to the energy receiving device in the optimal magnetic field direction and adjust output power of the coil so that the power received by the energy receiving device is substantially equal to the power required by the energy receiving device determined from the required power signal.

7. The energy transmitter according to claim 6, wherein the optimal electricity transmission module comprises:
  a cyclic stepping unit configured to control the magnetic field direction to step towards a same direction at the fixed angle until the magnetic field direction returns to an initial position; and
  a comparing and determining unit configured to
    a) obtain a first power value of the power signal received by the receiving device before the stepping and obtain a second power value of the received power signal, which is obtained after each stepping;
    b) compare both the obtained first and second power values of the received power signal; and
  determine a magnetic field direction corresponding to a maximum power value of the received power signal as the optimal magnetic field direction.

8. The energy transmitter according to claim 6, wherein the optimal electricity transmission module is further configured to:
  adjust a range of a two-dimensional quadrant or a three-dimensional quadrant in which the magnetic field direction is located by adjusting the phase difference; and
  adjust a deflection angle of the magnetic field direction within the range by adjusting the amplitude ratio between the currents, so as to cause the magnetic field direction to perform step change at the fixed angle.

\* \* \* \* \*